(12) United States Patent
Kokubun

(10) Patent No.: US 12,464,236 B2
(45) Date of Patent: Nov. 4, 2025

(54) IMAGING APPARATUS, FOCUS CONTROL METHOD, AND FOCUS CONTROL PROGRAM

(71) Applicant: FUJIFILM Corporation, Tokyo (JP)

(72) Inventor: Hideaki Kokubun, Saitama (JP)

(73) Assignee: FUJIFILM Corporation, Tokyo (JP)

(*) Notice: Subject to any disclaimer, the term of this patent is extended or adjusted under 35 U.S.C. 154(b) by 213 days.

(21) Appl. No.: 18/332,770

(22) Filed: Jun. 12, 2023

(65) Prior Publication Data

US 2023/0328375 A1  Oct. 12, 2023

Related U.S. Application Data

(63) Continuation of application No. PCT/JP2021/047735, filed on Dec. 22, 2021.

(30) Foreign Application Priority Data

Dec. 28, 2020  (JP) ................................ 2020-219588

(51) Int. Cl.
*H04N 23/67* (2023.01)

(52) U.S. Cl.
CPC ......... *H04N 23/672* (2023.01); *H04N 23/673* (2023.01)

(58) Field of Classification Search
CPC .. H04N 23/672; H04N 23/673; H04N 23/611; H04N 25/704; G02B 7/28; G03B 13/36; G03B 15/00
See application file for complete search history.

(56) References Cited

U.S. PATENT DOCUMENTS

2019/0170968 A1* 6/2019 Habe .................. H04N 23/611
2021/0103122 A1  4/2021 Habe

FOREIGN PATENT DOCUMENTS

| JP | 2010101972 | 5/2010 |
| JP | 2013160991 | 8/2013 |
| JP | 2017125985 | 7/2017 |
| JP | 2017181797 | 10/2017 |
| WO | 2018004001 | 1/2018 |

OTHER PUBLICATIONS

"International Search Report (Form PCT/ISA/210) of PCT/JP2021/047735," mailed on Mar. 15, 2022, with English translation thereof, pp. 1-5.
"Written Opinion of the International Searching Authority (Form PCT/ISA/237) of PCT/JP2021/047735," mailed on Mar. 15, 2022, with English translation thereof, pp. 1-6.
Office Action of Japan Counterpart Application, with English translation thereof, issued on Feb. 20, 2024, pp. 1-6.

* cited by examiner

*Primary Examiner* — Shahbaz Nazrul
(74) *Attorney, Agent, or Firm* — JCIPRNET

(57) ABSTRACT

An imaging apparatus includes: an imaging element that images a subject through an imaging optical system; and a processor, and the processor is configured to: detect a subject area as a second area from pixel data obtained by the imaging element at a second time point; and output, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

15 Claims, 16 Drawing Sheets

IMAGING APPARATUS, FOCUS CONTROL METHOD, AND FOCUS CONTROL PROGRAM

CROSS REFERENCE TO RELATED APPLICATION

This is a continuation of International Application No. PCT/JP2021/047735 filed on Dec. 22, 2021, and claims priority from Japanese Patent Application No. 2020-219588 filed on Dec. 28, 2020, the entire disclosures of which are incorporated herein by reference.

BACKGROUND OF THE INVENTION

1. Field of the Invention

The present invention relates to an imaging apparatus, a focus control method, and a computer readable medium storing a focus control program.

2. Description of the Related Art

In recent years, there has been a rapid increase in demand for information apparatuses such as a digital still camera, a digital video camera, or a smartphone having an imaging function in accordance with an increase in resolution of an imaging element such as a complementary metal oxide semiconductor (CMOS) image sensor. The above information apparatuses having the imaging function are referred to as imaging apparatuses. In the imaging apparatuses, a contrast auto focus (AF) system or a phase difference AF system is employed as a focus control system for focusing on a main subject.

JP2017-125985A discloses an imaging apparatus that, in a focus assistance function that is an auxiliary function of manual focus for showing a user how much a main subject region is out of focus from a defocus amount, updates the defocus amount of the main subject region a plurality of times in one frame period by reading out only the main subject region from an imaging element separately from a normal readout from the imaging element in one frame period.

JP2010-101972A discloses an auto focus adjustment device that sets a detection region corresponding to a region including a detected subject image for each image of frames represented by read-out image signals, detects a defocus amount based on an image signal corresponding to the set detection region, and obtains a lens drive amount for driving a focus lens based on the detected defocus amount.

SUMMARY OF THE INVENTION

One embodiment according to the disclosed technology provides an imaging apparatus, a focus control method, and a computer readable medium storing a focus control program that can improve focus accuracy.

An imaging apparatus that is one embodiment according to the disclosed technology is an imaging apparatus comprising an imaging element that images a subject through an imaging optical system, and a processor, in which the processor is configured to detect a subject area as a second area from pixel data obtained by the imaging element at a second time point, and output, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

A focus control method that is another embodiment according to the disclosed technology is a focus control method by an imaging apparatus including an imaging element that images a subject through an imaging optical system, and a processor, the focus control method comprising, via the processor, detecting a subject area as a second area from pixel data obtained by the imaging element at a second time point, and outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

A focus control program, which is stored in a computer readable medium, that is still another embodiment according to the disclosed technology is a focus control program of an imaging apparatus including an imaging element that images a subject through an imaging optical system, and a processor, the focus control program causing the processor to execute a process comprising detecting a subject area as a second area from pixel data obtained by the imaging element at a second time point, and outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

According to the present invention, it is possible to provide an imaging apparatus, a focus control method, and a focus control program that can improve focus accuracy.

DESCRIPTION OF THE PREFERRED EMBODIMENTS

Hereinafter, an embodiment of the present invention will be described with reference to the drawings.

Figure 1:
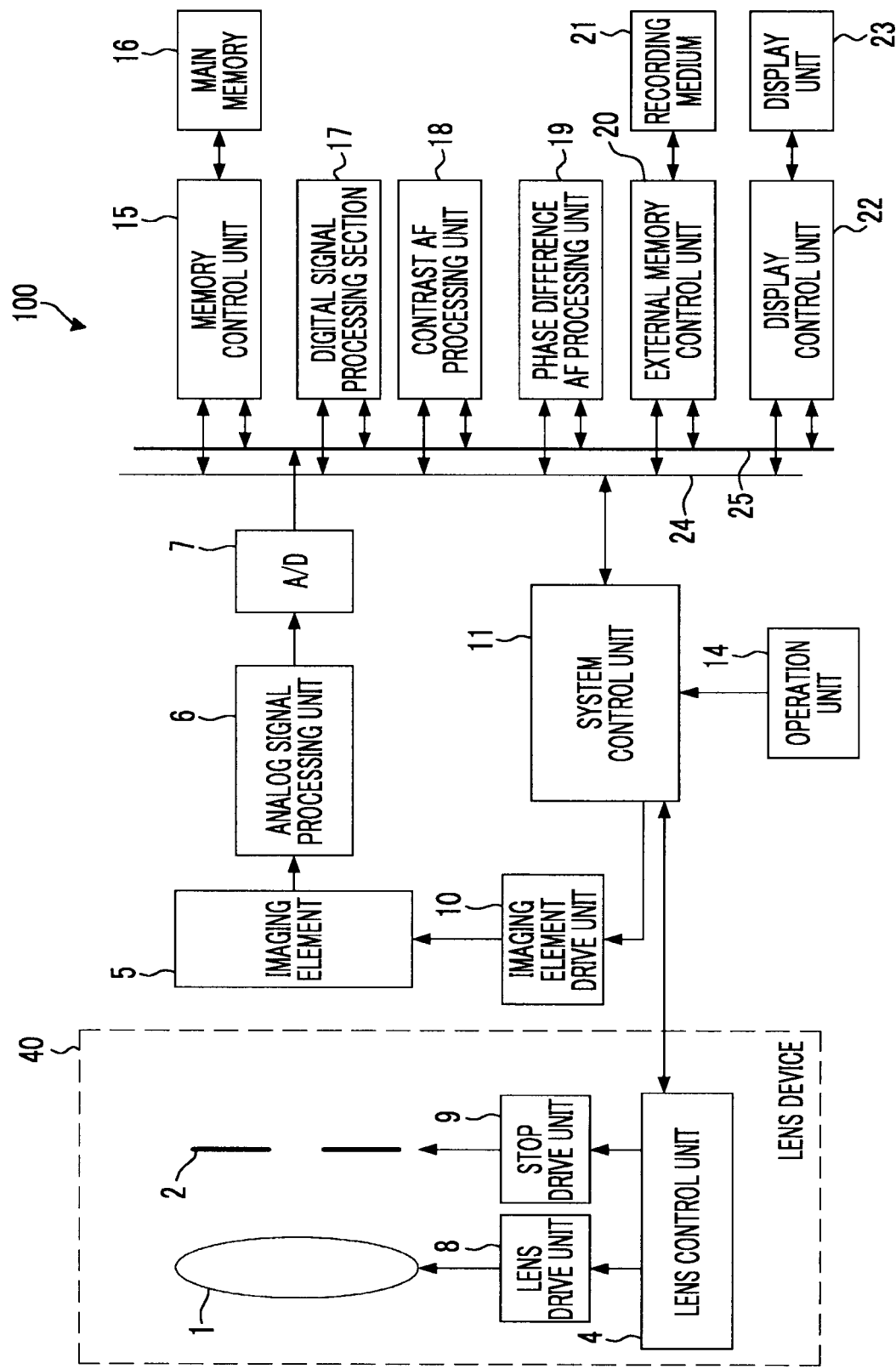
FIG. 1 is a diagram illustrating a schematic configuration of a digital camera 100 that is an embodiment of an imaging apparatus according to the present invention.

FIG. 1 is a diagram illustrating a schematic configuration of a digital camera 100 that is an embodiment of an imaging apparatus according to the present invention.

The digital camera 100 illustrated in FIG. 1 comprises a lens device 40 including an imaging lens 1, a stop 2, a lens control unit 4, a lens drive unit 8, and a stop drive unit 9.

In the present embodiment, the lens device 40 may be attachable to and detachable from a body of the digital camera 100 or may be fixed to the body of the digital camera 100.

The imaging lens 1 and the stop 2 constitute an imaging optical system, and the imaging optical system includes at least a focus lens. The focus lens is a lens for adjusting a focus position of the imaging optical system and is composed of a single lens or of a plurality of lenses. The focus position is adjusted by moving the focus lens in an optical axis direction of the imaging optical system.

A liquid lens with which the focus position can be changed by variably controlling a curved surface of the lens may be used as the focus lens.

The lens control unit 4 of the lens device 40 is configured to communicate with a system control unit 11 in the body of the digital camera 100 in a wired or wireless manner.

The lens control unit 4 drives the focus lens included in the imaging lens 1 through the lens drive unit 8 or drives the stop 2 through the stop drive unit 9 in accordance with instructions from the system control unit 11.

The body of the digital camera 100 comprises an imaging element 5 such as a CCD image sensor or a CMOS image sensor that images a subject through the imaging optical system, an analog signal processing unit 6 that is connected to an output of the imaging element 5 and that performs analog signal processing such as correlative double sampling processing, an analog-to-digital conversion circuit 7 that converts an analog signal output from the analog signal processing unit 6 into a digital signal, an imaging element drive unit 10, the system control unit 11 that manages and controls the entire digital camera 100, and an operation unit 14.

The analog signal processing unit 6, the analog-to-digital conversion circuit 7, and the imaging element drive unit 10 are controlled by the system control unit 11.

The system control unit 11 drives the imaging element 5 through the imaging element drive unit 10 and outputs a subject image captured through the imaging optical system as a captured image signal. Command signals from a user are input into the system control unit 11 through the operation unit 14.

The system control unit 11 is composed of a processor and of a memory such as a random access memory (RAM) and a flash memory.

The system control unit 11 implements each function, described later, by executing programs including a focus control program stored in the incorporated flash memory.

Furthermore, an electric control system of the digital camera 100 comprises a main memory 16, a memory control unit 15 connected to the main memory 16, a digital signal processing section 17 that generates captured image data by performing signal processing on the captured image signal output from the analog-to-digital conversion circuit 7, a contrast AF processing unit 18 that determines the focus position based on a contrast AF system, a phase difference AF processing unit 19 that calculates a defocus amount based on a phase difference AF system, an external memory control unit 20 to which an attachable and detachable recording medium 21 is connected, and a display control unit 22 to which a display unit 23 mounted on a camera rear surface or the like is connected. The defocus amount is an amount indicating how much the subject is currently out of focus, and is an example of the focus position. The focus position is not limited to the defocus amount and may be a subject distance that is a distance between the digital camera 100 and the subject, a drive parameter of the focus lens of the imaging lens 1 for focusing on the subject, or the like.

The memory control unit 15, the digital signal processing section 17, the contrast AF processing unit 18, the phase difference AF processing unit 19, the external memory control unit 20, and the display control unit 22 are connected to each other by a control bus 24 and by a data bus 25 and are controlled in accordance with instructions from the system control unit 11.

Figure 2:
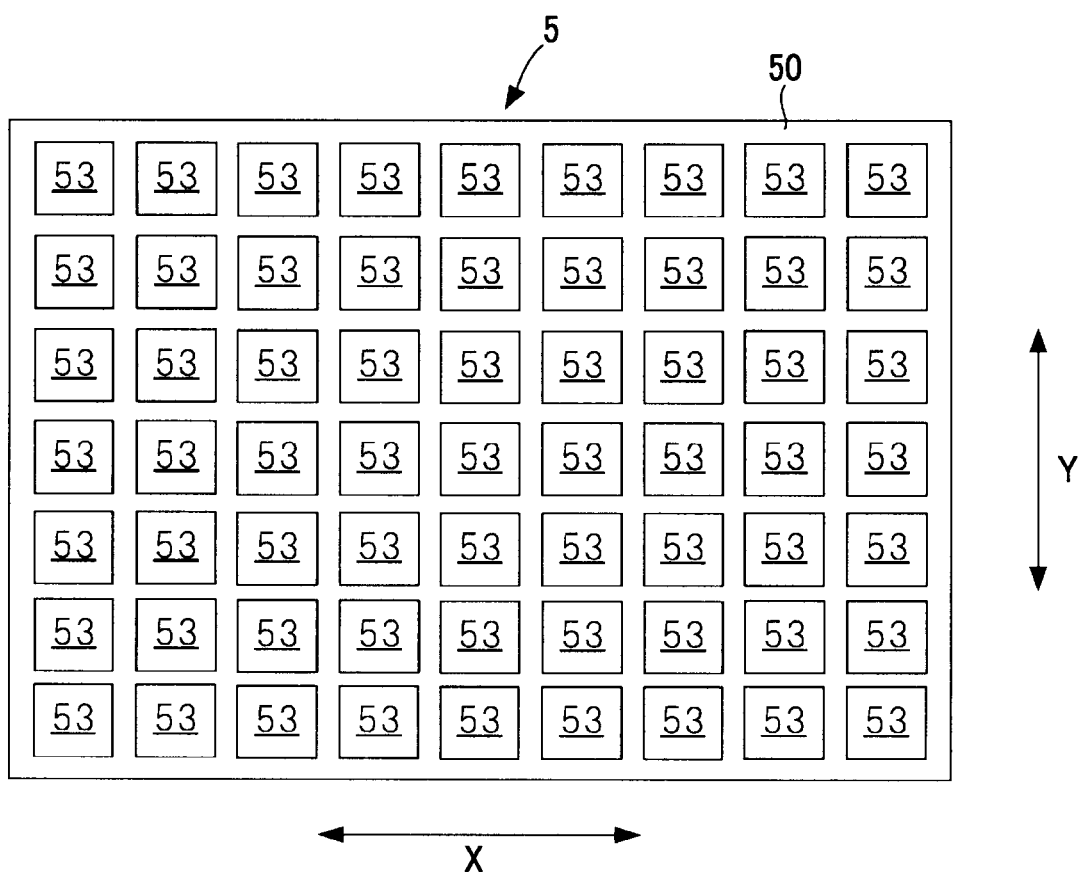
FIG. 2 is a schematic plan view illustrating an example of a configuration of an imaging element 5 mounted in the digital camera 100.

FIG. 2 is a schematic plan view illustrating an example of a configuration of the imaging element 5 mounted in the digital camera 100.

The imaging element 5 has a light-receiving surface 50 on which multiple pixels two-dimensionally arranged in a row direction X and in a column direction Y orthogonal to the row direction X are disposed.

In the example in FIG. 2, 63 focus detection areas (hereinafter, referred to as AF areas) 53 that are areas to be focused on (areas in which the subject image to be focused on is formed) are provided on the light-receiving surface 50.

In the digital camera 100, one or a plurality of consecutive AF areas 53 are selected from the 63 AF areas 53 illustrated in FIG. 2, and a focus control of focusing on the subject imaged by the selected AF area 53 is performed.

The AF areas 53 are areas including an imaging pixel and a phase difference detection pixel as a pixel. Only the imaging pixel is disposed in a part of the light-receiving surface 50 except the AF areas 53.

Figure 3:
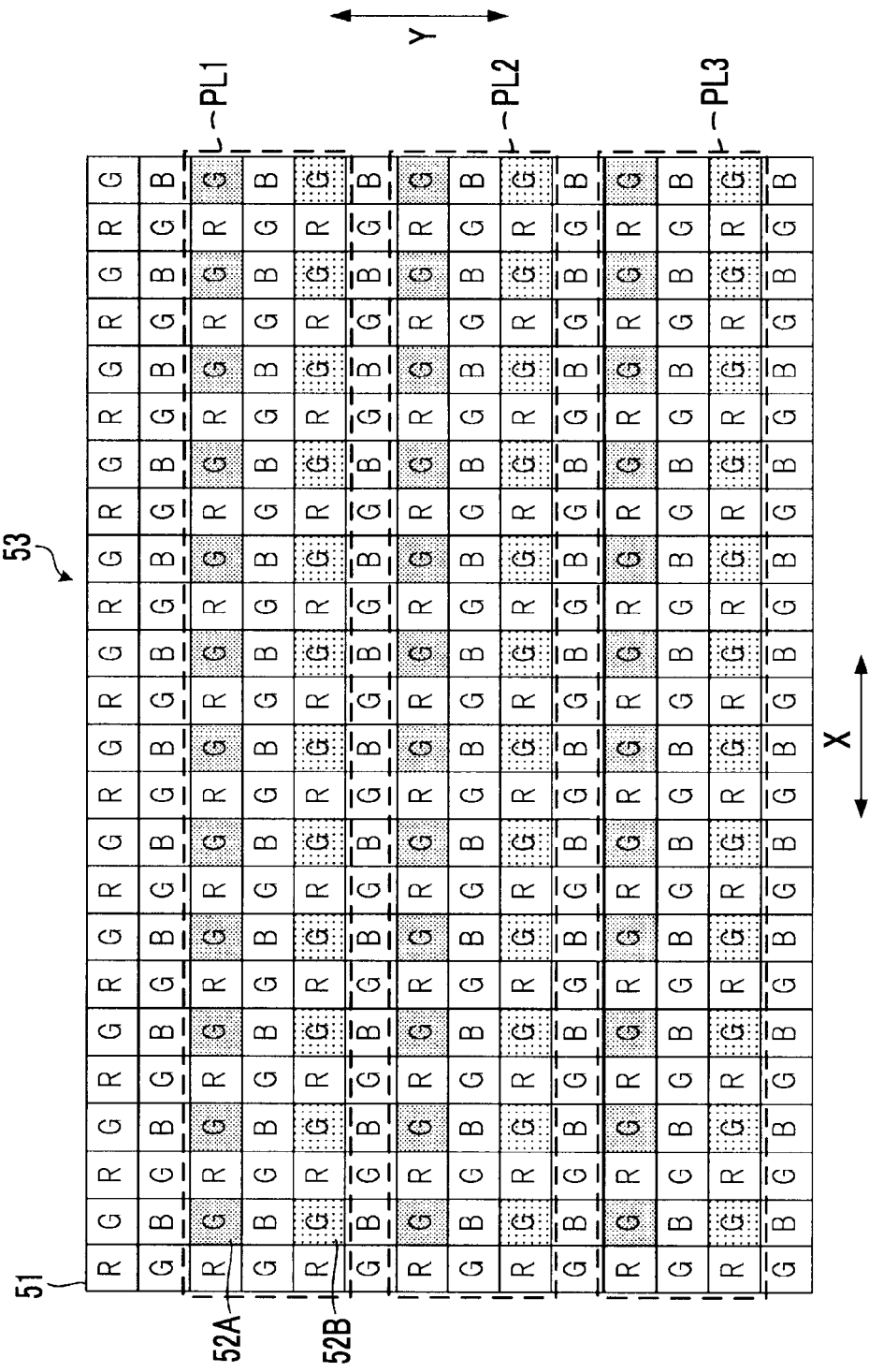
FIG. 3 is a partial enlarged view of one AF area 53 illustrated in FIG. 2.

FIG. 3 is a partial enlarged view of one AF area 53 illustrated in FIG. 2.

Pixels 51 (square blocks in the drawing) are two-dimensionally arranged in the AF area 53. Each pixel 51 includes a photoelectric conversion unit such as a photodiode and a color filter formed above the photoelectric conversion unit. Each pixel 51 may be configured to separate light based on a structure of the photodiode instead of using the color filter.

In FIG. 3, the pixel 51 (R pixel 51) including a color filter (R filter) that allows transmission of red light is designated by a character "R".

In FIG. 3, the pixel 51 (G pixel 51) including a color filter (G filter) that allows transmission of green light is designated by a character "G".

In FIG. 3, the pixel 51 (B pixel 51) including a color filter (B filter) that allows transmission of blue light is designated by a character "B". Arrangement of the color filters corresponds to Bayer arrangement over the light-receiving surface 50.

In the AF area 53, a part (hatched pixels in FIG. 3) of the G pixels 51 includes phase difference detection pixels 52A and 52B. In the example in FIG. 3, each G pixel 51 in any pixel row among pixel rows including the R pixels 51 and the G pixels 51 is the phase difference detection pixel 52A, and the G pixel 51 of the same color closest to the each G pixel 51 in the column direction Y is the phase difference detection pixel 52B.

The phase difference detection pixel 52A and the phase difference detection pixel 52B of the same color closest thereto in the column direction Y constitute a pair. However, arrangement of these phase difference detection pixels is merely an example, and other arrangements may be used. For example, a part of the G pixels 51 may be the phase difference detection pixel, and the phase difference detection pixel may be disposed in the R pixels 51 or in the B pixels 51.

The phase difference detection pixels 52A in the third pixel row from the top in FIG. 3 and the phase difference detection pixels 52B in the fifth pixel row from the top in FIG. 3 constitute a pair line PL1 composed of a plurality of the pairs arranged in the row direction X.

The phase difference detection pixels 52A in the seventh pixel row from the top in FIG. 3 and the phase difference detection pixels 52B in the ninth pixel row from the top in FIG. 3 constitute a pair line PL2 composed of a plurality of the pairs arranged in the row direction X.

The phase difference detection pixels 52A in the eleventh pixel row from the top in FIG. 3 and the phase difference detection pixels 52B in the thirteenth pixel row from the top in FIG. 3 constitute a pair line PL3 composed of a plurality of the pairs arranged in the row direction X.

Accordingly, the plurality of pair lines are arranged in the column direction Y in the AF area 53.

Figure 4:
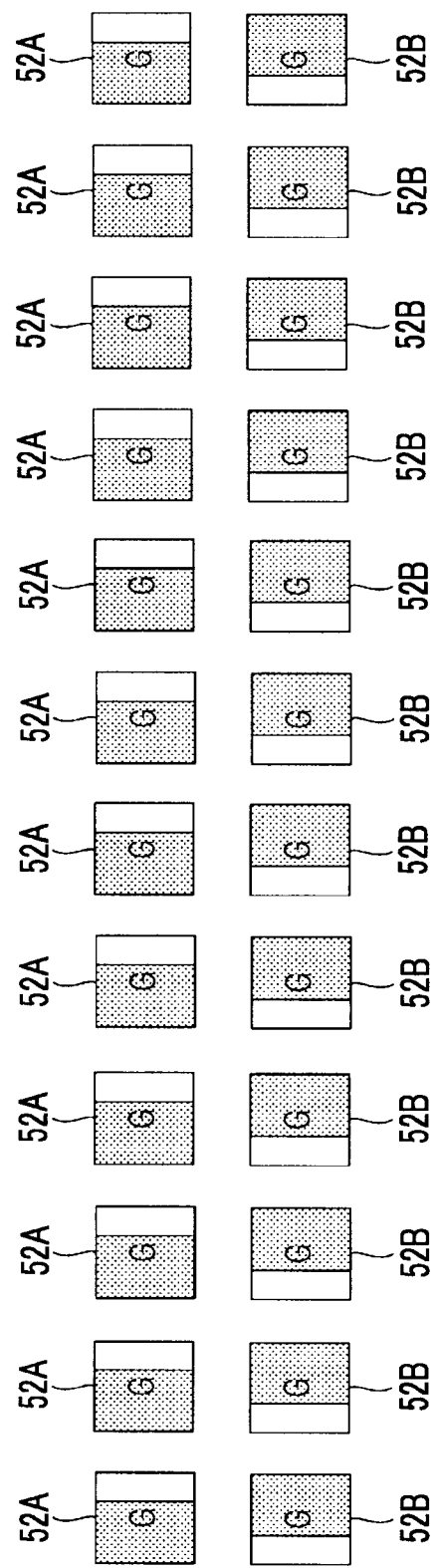
FIG. 4 is a diagram illustrating phase difference detection pixels constituting any pair line illustrated in FIG. 3.

FIG. 4 is a diagram illustrating the phase difference detection pixels constituting any pair line illustrated in FIG. 3.

Each phase difference detection pixel 52A is a first signal detection unit that receives a luminous flux which has passed through one divided region of a pupil region of the imaging lens 1 divided into two parts in the row direction X, and that detects a signal corresponding to an amount of received light.

Each phase difference detection pixel 52B is a second signal detection unit that receives a luminous flux which has passed through the other divided region of the pupil region, and that detects a signal corresponding to an amount of received light.

In the AF area 53, a plurality of the pixels 51 other than the phase difference detection pixels 52A and 52B are the imaging pixels. Each imaging pixel receives luminous fluxes that have passed through both of the two divided regions of the pupil region of the imaging lens 1, and detects a signal corresponding to an amount of received light.

A light shielding film is provided above the photoelectric conversion unit of each pixel 51, and an opening that defines an area of a light-receiving surface of the photoelectric conversion unit is formed in the light shielding film.

A center of the opening of each imaging pixel matches a center of the photoelectric conversion unit of each imaging pixel. On the other hand, a center of the opening (white parts in FIG. 4) of each phase difference detection pixel 52A is eccentric to one side (a left side) of a center of the photoelectric conversion unit of each phase difference detection pixel 52A.

In addition, a center of the opening (white parts in FIG. 4) of each phase difference detection pixel 52B is eccentric to the other side (a right side) of a center of the photoelectric conversion unit of each phase difference detection pixel 52B.

Figure 5:
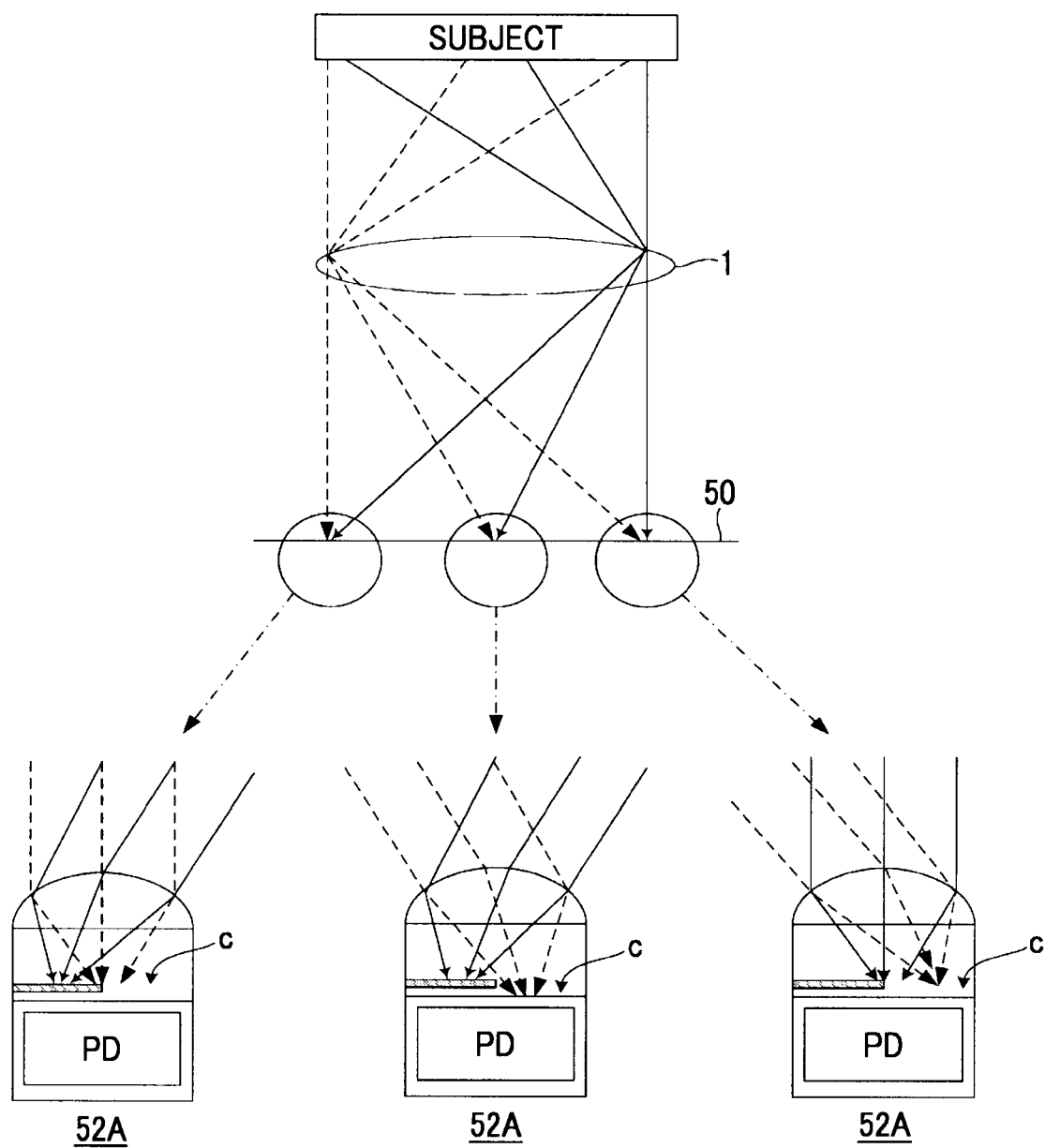
FIG. 5 is a diagram illustrating a cross section configuration of a phase difference detection pixel 52A.

FIG. 5 is a diagram illustrating a cross section configuration of each phase difference detection pixel 52A. As illustrated in FIG. 5, in the phase difference detection pixel 52A, an opening c is eccentric to one side (right) of a photoelectric conversion unit PD.

As illustrated in FIG. 5, by covering a side of the photoelectric conversion unit PD with the light shielding film, the phase difference detection pixel 52A can be selectively shielded from light incident from a direction opposite to a direction of the side covered with the light shielding film.

With this configuration, it is possible to detect a phase difference in the row direction X in an image captured by each of two pixel groups that include a pixel group consisting of the phase difference detection pixels 52A constituting any pair line and a pixel group consisting of the phase difference detection pixels 52B constituting the pair line.

A pixel configuration of the imaging element 5 is not limited to the configurations illustrated in FIG. 2 to FIG. 5.

For example, a configuration in which all pixels included in the imaging element 5 are the imaging pixels and in which each imaging pixel is divided into two parts in the row direction X to use one divided part as the phase difference detection pixel 52A and to use the other divided part as the phase difference detection pixel 52B may be used.

Figure 6:
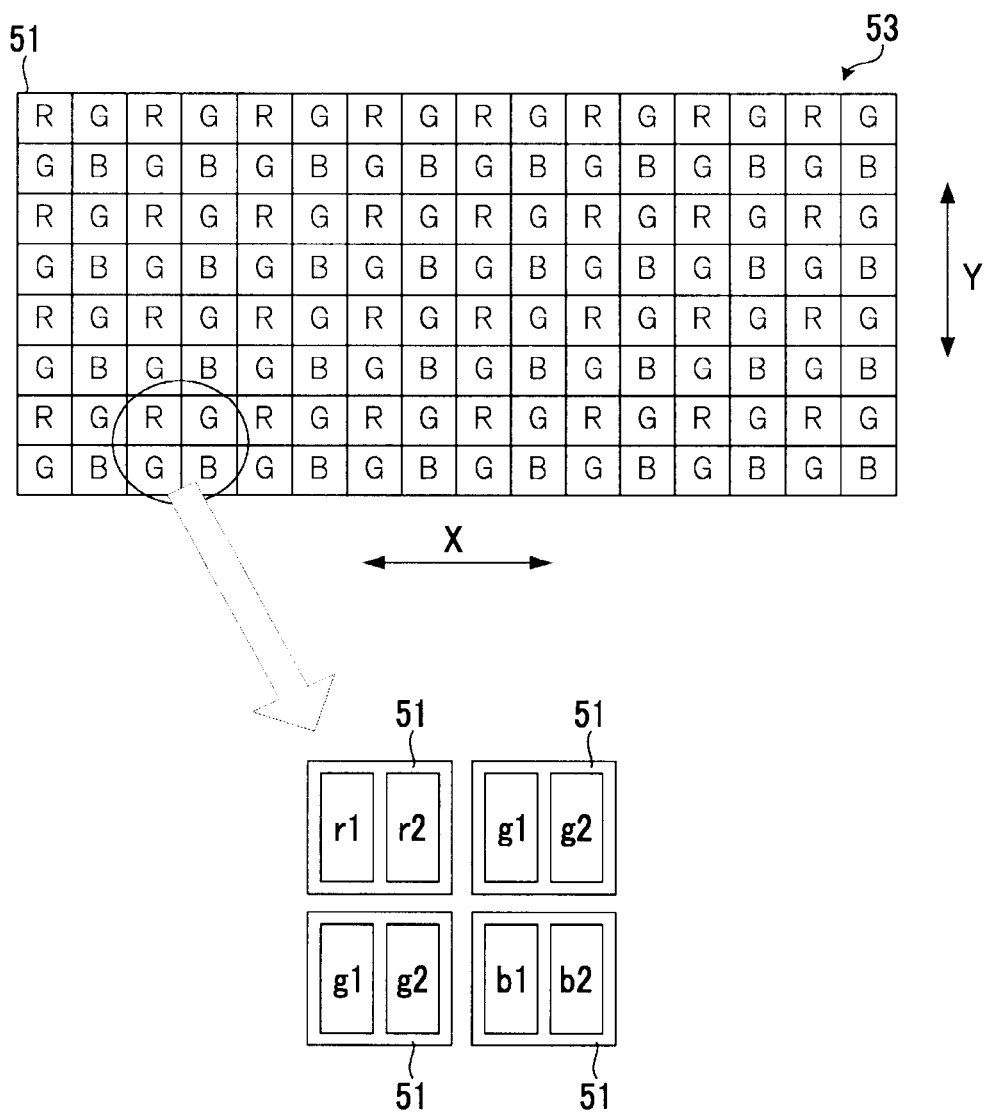
FIG. 6 is a diagram illustrating a configuration in which all pixels 51 included in the imaging element 5 are imaging pixels and in which each pixel 51 is divided into two parts.

FIG. 6 is a diagram illustrating a configuration in which all pixels 51 included in the imaging element 5 are the imaging pixels and in which each pixel 51 is divided into two parts.

In the configuration in FIG. 6, each pixel 51 designated by R in the imaging element 5 is divided into two parts, and the two divided parts are used as a phase difference detection pixel r1 and a phase difference detection pixel r2, respectively.

In addition, each pixel 51 designated by G in the imaging element 5 is divided into two parts, and the two divided parts are used as a phase difference detection pixel g1 and a phase difference detection pixel g2, respectively.

Furthermore, each pixel 51 designated by B in the imaging element 5 is divided into two parts, and the two divided parts are used as a phase difference detection pixel b1 and a phase difference detection pixel b2, respectively.

In this configuration, each of the phase difference detection pixels r1, g1, and b1 is the first signal detection unit, and each of the phase difference detection pixels r2, g2, and b2 is the second signal detection unit.

In the configuration example in FIG. 6, in a case where signals of the first signal detection unit and the second signal detection unit included in one pixel 51 are added, a normal imaging signal not having a phase difference is obtained. That is, in the configuration in FIG. 6, all pixels can be used as both of the phase difference detection pixel and the imaging pixel. In addition, in the configuration example in FIG. 6, it is possible to improve a degree of freedom in setting a size and a shape of the AF area.

The system control unit 11 selectively performs any of the focus control based on the phase difference AF system and the focus control based on the contrast system.

The phase difference AF processing unit 19, in accordance with instructions from the system control unit 11, calculates a phase difference that is a relative misregistration amount between two images formed by the pair of luminous fluxes, using a detection signal group read out from the phase difference detection pixels 52A and from the phase difference detection pixels 52B in one or the plurality of AF areas 53 selected from the 63 AF areas 53 by a user operation or the like.

The phase difference AF processing unit 19 obtains a focus adjustment state of the imaging lens 1 based on the phase difference. Here, the focus adjustment state is defocus data including the defocus amount and a defocus direction.

The system control unit 11 performs the focus control based on the phase difference AF system that uses a result of a correlation operation, by driving the focus lens based on the defocus data.

The contrast AF processing unit 18 analyzes a captured image captured by the imaging element 5 and determines the focus position of the imaging lens 1 based on the contrast AF system.

That is, the contrast AF processing unit 18 obtains a contrast (a difference between light and dark) of the captured image obtained for each position (a plurality of positions) after movement while moving a position of the focus lens of the imaging lens 1 under control of the system control unit 11. The position of the focus lens at which the highest contrast is obtained is determined as a highest-contrast focus position.

The system control unit 11 performs the focus control based on the contrast AF system that uses the contrast of the captured image, by driving the focus lens based on the highest-contrast focus position determined by the contrast AF processing unit 18.

In addition, the digital camera 100 may be equipped with a continuous AF mode in which the focus control of focusing on the subject is continuously performed a plurality of times. For example, the digital camera 100 continuously performs the focus control of focusing on the subject a plurality of times while displaying a live preview image (live view image) that is an image showing the captured image obtained by continuous imaging via the imaging element 5 in real time.

Figure 7:
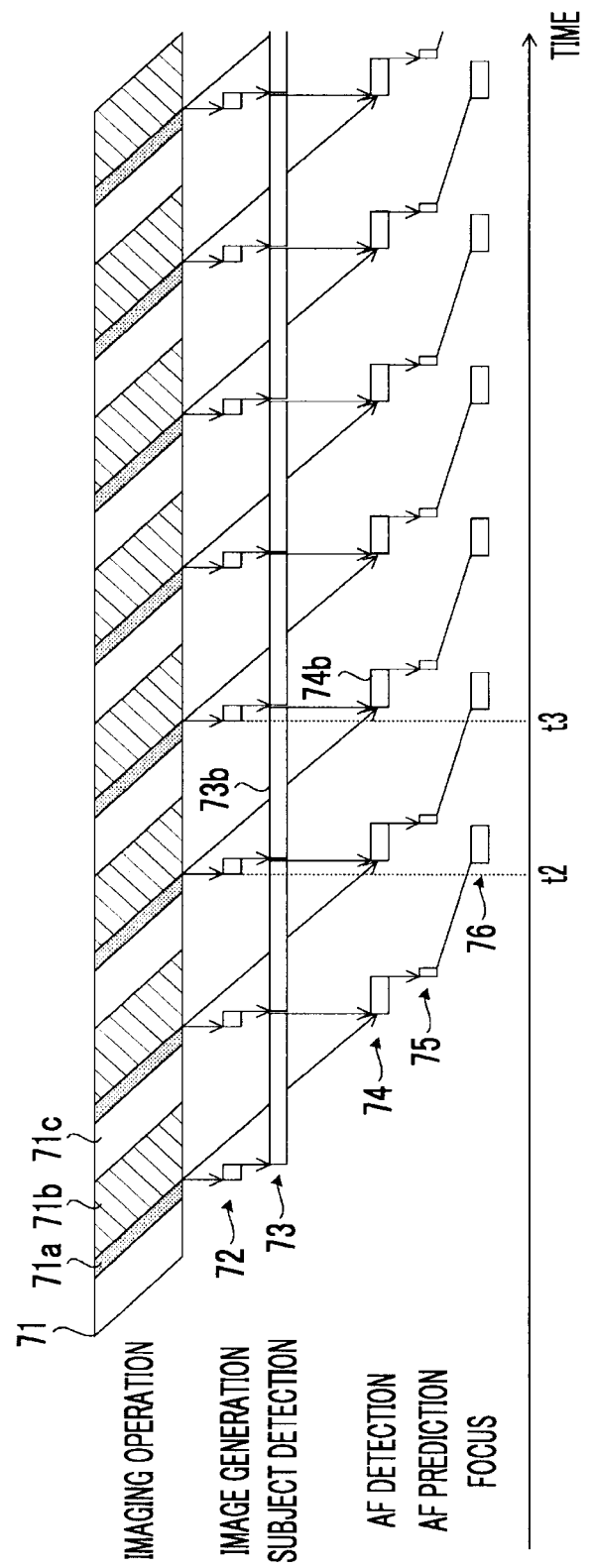
FIG. 7 is a diagram illustrating an example of a timing of each operation of the digital camera 100.

FIG. 7 is a diagram illustrating an example of a timing of each operation of the digital camera 100. In FIG. 7, a horizontal axis denotes time.

Imaging operation 71 shows a periodic operation related to imaging via the imaging element 5. Specifically, the imaging operation 71 is an operation of periodically repeating exposure operation 71a, display operation 71b, and recording operation 71c.

The exposure operation 71a (parts hatched with dots) is an operation of exposure via the imaging element 5. The display operation 71b (parts hatched with diagonal lines) is an operation in which processing for displaying the live preview image based on pixel data obtained by the imaging element 5 on the display unit 23 is performed. The recording operation 71c (not hatched) is an operation in which processing for recording image data based on the pixel data obtained by the imaging element 5 on the recording medium 21 is performed.

Image generation 72 is an operation of generating a subject detection image (an image for subject detection) based on the pixel data obtained by the exposure operation 71a. Subject detection 73 is an operation of detecting a subject area in which the subject is present in the subject detection image generated by the image generation 72. The subject may be a subject designated by the user or may be a subject automatically detected by the digital camera 100.

AF detection 74 is an operation in which the phase difference AF processing unit 19 calculates a phase difference of a part corresponding to the subject area detected by the subject detection 73 in the pixel data obtained by the exposure operation 71a and calculates the defocus amount based on the calculated phase difference. At this point, as illustrated in FIG. 7, the phase difference AF processing unit 19 calculates the phase difference based on the pixel data used in the immediately previous subject detection 73 instead of the latest pixel data at the moment.

For example, subject detection 73b is the subject detection 73 based on the pixel data obtained at time point t2. AF detection 74b is the AF detection 74 based on the subject detection 73b. The latest pixel data at the moment of performing the AF detection 74 is the pixel data obtained at time point t3. At this point, the phase difference AF processing unit 19, in the AF detection 74b, calculates the phase difference of the part corresponding to the subject area detected by the subject detection 73b in the pixel data of time point t2 used in the subject detection 73b instead of the pixel data obtained at time point t3.

AF prediction 75 is an operation in which the phase difference AF processing unit 19 calculates a prediction value of the defocus amount at a subsequent focus timing based on a result of the AF detection 74. While the result of the immediately previous AF detection 74 performed once is referred to in the AF prediction 75 in FIG. 7, the results of the AF detection 74 performed a plurality of times in the past are actually referred to in order to calculate the prediction value of the defocus amount.

Focus 76 shows an operation timing at which the focus control is performed by driving the focus lens of the imaging lens 1 based on the prediction value of the defocus amount calculated by the AF prediction 75.

While an operation of performing the subject detection 73 for each period of the imaging operation 71 has been described in FIG. 7, the present invention is not limited to such an operation. For example, the digital camera 100 may perform or not perform the subject detection 73 for each period of the imaging operation 71 depending on a processing load or the like.

Figure 8:
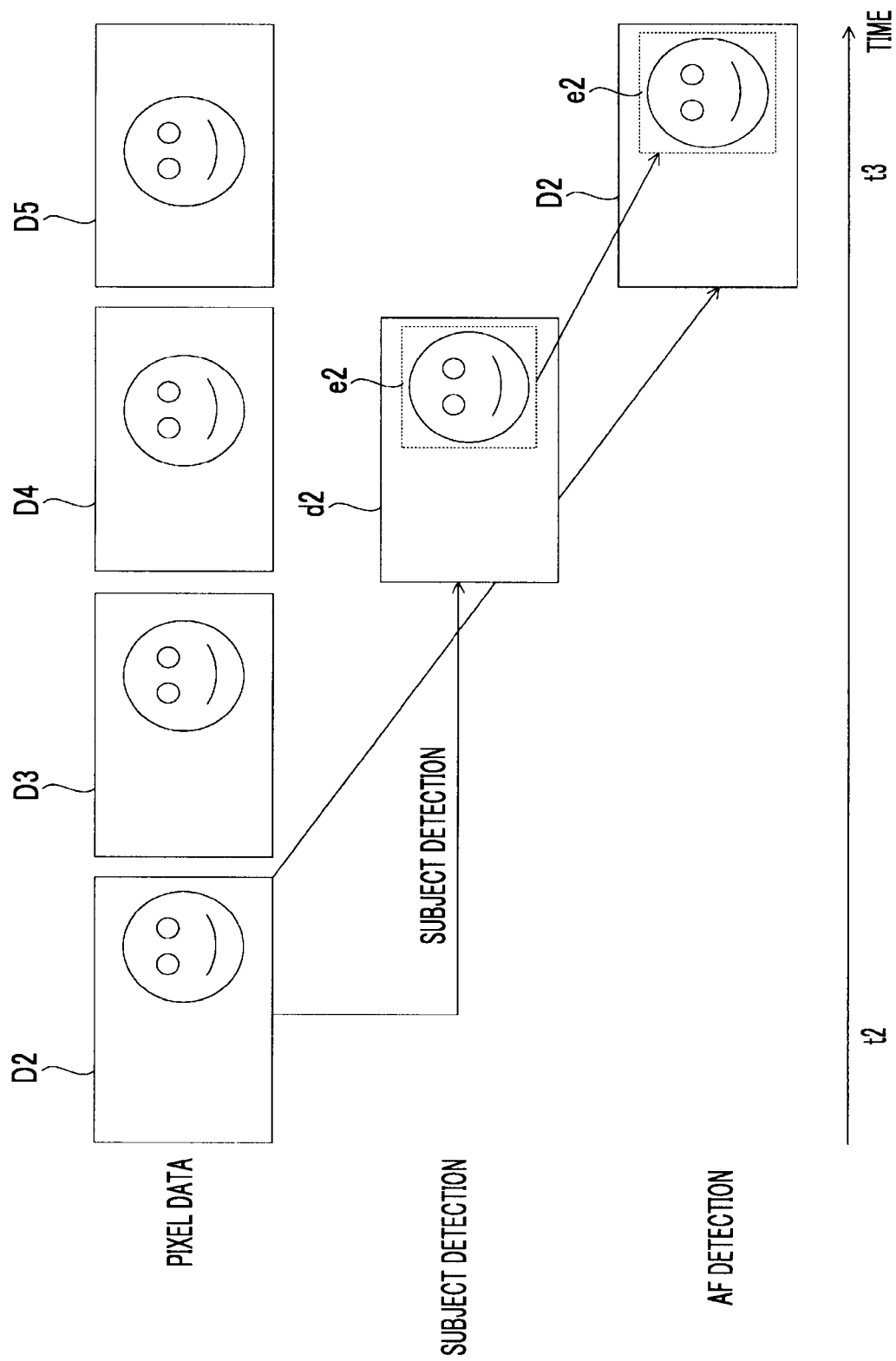
FIG. 8 is a diagram illustrating an example of a focus operation of the digital camera 100 corresponding to FIG. 7.

FIG. 8 is a diagram illustrating an example of a focus operation of the digital camera 100 corresponding to FIG. 7. In FIG. 8, a horizontal axis denotes time.

Each of pixel data D2 to D5 is the pixel data continuously obtained by the imaging element 5. In this example, the subject (a face of a person) is moving toward a center from a right end. For example, the pixel data D2 is the pixel data obtained at time point t2 illustrated in FIG. 7, and the pixel data D5 is the pixel data obtained at time point t3 illustrated in FIG. 7.

The digital camera 100 generates a subject detection image d2 based on, for example, the pixel data D2 and performs the subject detection of detecting the subject area in which the subject is present from the subject detection image d2 as a second area e2. The digital camera 100 performs the AF detection based on the detected second area e2.

At this moment, for example, the pixel data D2 to D5 are present as the pixel data on which the AF detection can be performed, and the latest pixel data is the pixel data D5. In this example, the digital camera 100 performs the AF detection based on the pixel data D2 (original data from which the subject detection image d2 is generated) used in the subject detection instead of the pixel data D5. That is, the digital camera 100 calculates the defocus amount by calculating the phase difference of the part corresponding to the second area e2 in the pixel data D2. This defocus amount is an example of a first focus position.

Figure 9:
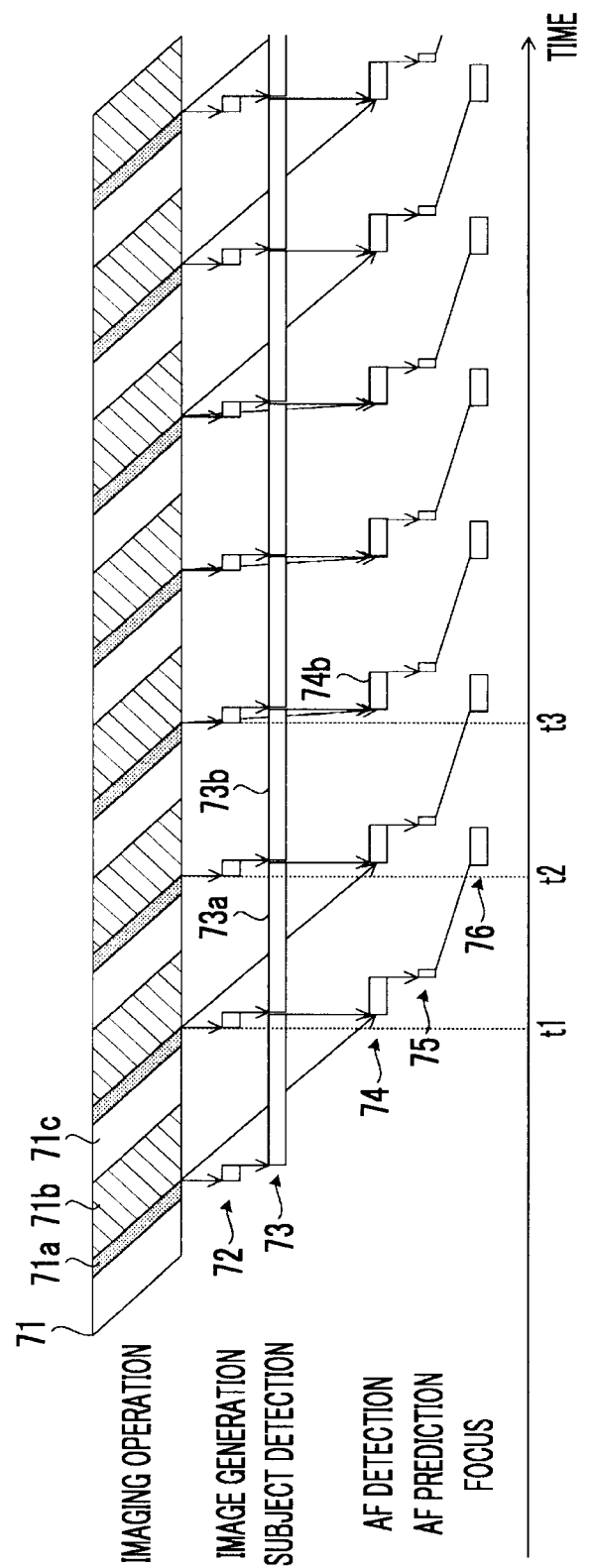
FIG. 9 is a diagram illustrating another example of the timing of each operation of the digital camera 100.

FIG. 9 is a diagram illustrating another example of the timing of each operation of the digital camera 100. The same parts as the parts illustrated in FIG. 7 will be designated by the identical reference numerals in FIG. 9, and those parts will not be described. Subject detection 73a illustrated in FIG. 9 is the subject detection 73 based on the pixel data obtained at time point t1 before time point t2. In a case where a deviation between the subject area detected by the subject detection 73a and the subject area detected by the subject detection 73b is small, the digital camera 100 uses the latest pixel data in the AF detection 74b based on the subject detection 73b instead of the pixel data used in the subject detection 73b.

Figure 10:
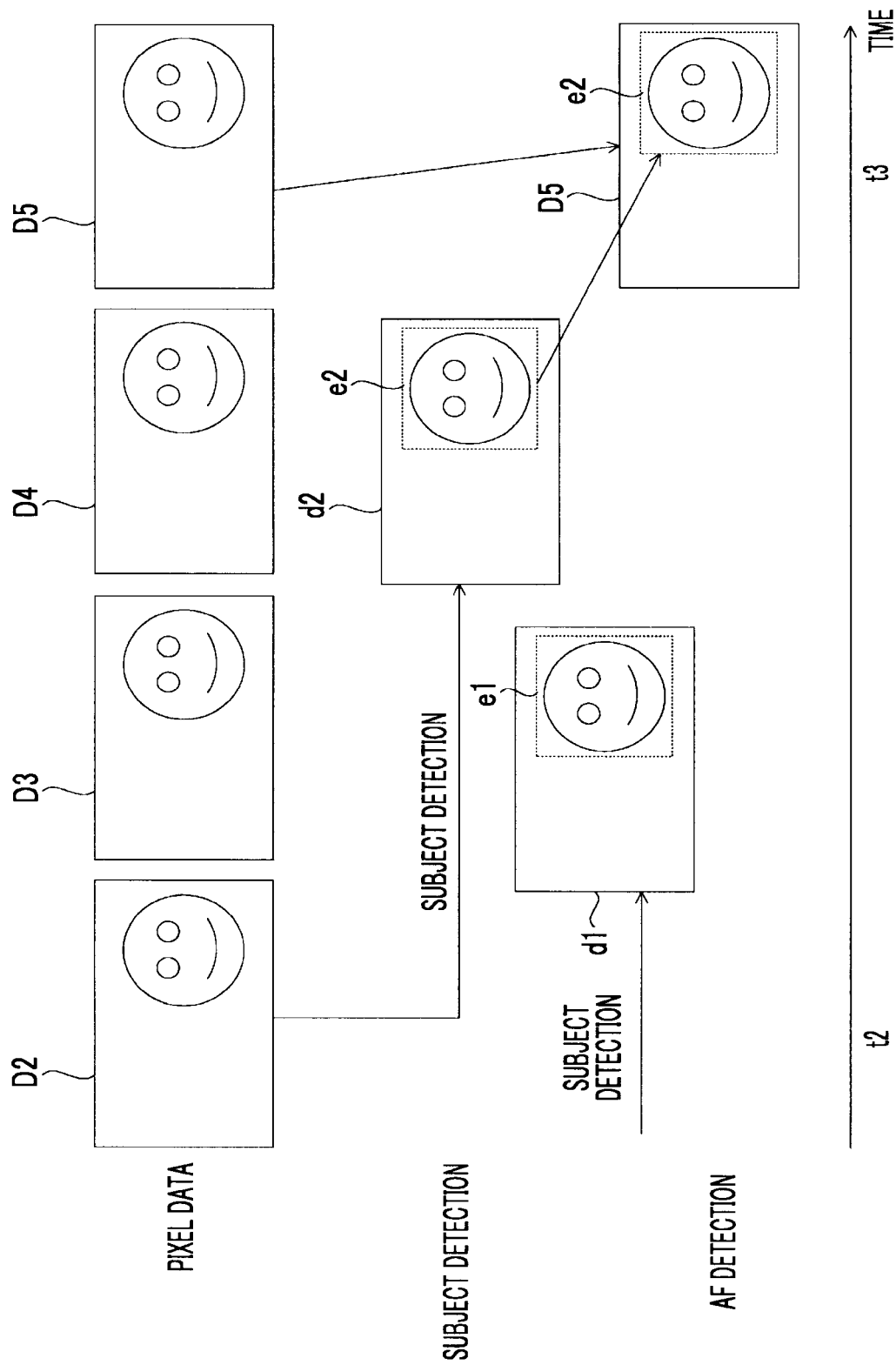
FIG. 10 is a diagram illustrating an example of the focus operation of the digital camera 100 corresponding to FIG. 9.

FIG. 10 is a diagram illustrating an example of the focus operation of the digital camera 100 corresponding to FIG. 9. The same parts as the parts illustrated in FIG. 8 will be designated by the identical reference numerals in FIG. 10, and those parts will not be described. A subject detection image d1 illustrated in FIG. 10 is the subject detection image generated from the pixel data (not illustrated in FIG. 10) obtained at time point t1 illustrated in FIG. 9. A first area e1 is an area detected from the subject detection image d1 as the subject area in which the subject is present.

The digital camera 100 compares the first area e1 with the second area e2 in the AF detection based on the second area e2 and, in a case where a deviation between both is small, performs the AF detection based on the latest pixel data D5 instead of the pixel data D2 (the original data from which the subject detection image d2 is generated). That is, the digital camera 100 calculates the defocus amount by calculating the phase difference of the part corresponding to the second area e2 in the pixel data D5. This defocus amount is an example of a second focus position.

Accordingly, the digital camera 100 detects the subject area as the second area e2 from the pixel data D2 obtained at time point t2 (second time point). In addition, the digital camera 100 selects any of the first focus position (the defocus amount based on the AF detection in FIG. 8) based on data of the second area e2 in the pixel data D2 obtained at time point t2, and the second focus position (the defocus amount based on the AF detection in FIG. 10) based on the data of the second area e2 in the pixel data D5 obtained at time point t3 (third time point) after time point t2. The digital camera 100 performs lens driving by outputting a control signal generated using the selected focus position to a lens drive mechanism of the imaging lens 1 (imaging optical system). The lens drive mechanism is a drive mechanism of the focus lens included in the imaging lens 1. The focus lens may be a focus lens using a liquid lens.

Specifically, the digital camera 100 selects any of the first focus position and the second focus position based on a result of comparison between the first area e1 detected as the subject area from the pixel data obtained at time point t1 (first time point) before time point t2 and the second area e2 detected as the subject area from the pixel data obtained at time point t2.

In addition, the pixel data D5 obtained at time point t3 is the pixel data obtained by the imaging element 5 immediately before a time point at which the second area e2 is detected. Accordingly, it is possible to perform the AF detection using the latest pixel data in performing the AF detection.

According to the digital camera 100, in a case where the subject movement in vertical and horizontal directions (two-dimensional directions of the captured image) is large, AF is performed based on the pixel data used in the subject detection. Thus, even in a case where the subject moves in the vertical and horizontal directions during the subject detection, it is possible to avoid performing AF in a state where the AF area 53 and the subject are deviating from each other. Thus, it is possible to suppress a decrease in focus accuracy caused by the movement of the subject in the vertical and horizontal directions.

In addition, in a case where the subject movement in the vertical and horizontal directions is small, AF is performed based on the pixel data (for example, the latest pixel data) that is newer than the pixel data used in the subject detection. Thus, even in a case where the subject moves in a depth direction (a direction orthogonal to the captured image) during the subject detection, it is possible to focus on the subject after the movement. Thus, it is possible to suppress a decrease in the focus accuracy caused by the movement of the subject in the depth direction.

Thus, according to the digital camera 100, it is possible to improve the focus accuracy. Here, each of time point t1, time point t2, and time point t3 is a time point included in time points of periodic imaging via the imaging element 5. Accordingly, by performing AF based on the pixel data obtained by periodic imaging via the imaging element 5, it is possible to improve the focus accuracy while continuously performing the focus control of focusing on the subject at a time of capturing a video image or at a time of displaying the live preview image.

Figure 11:
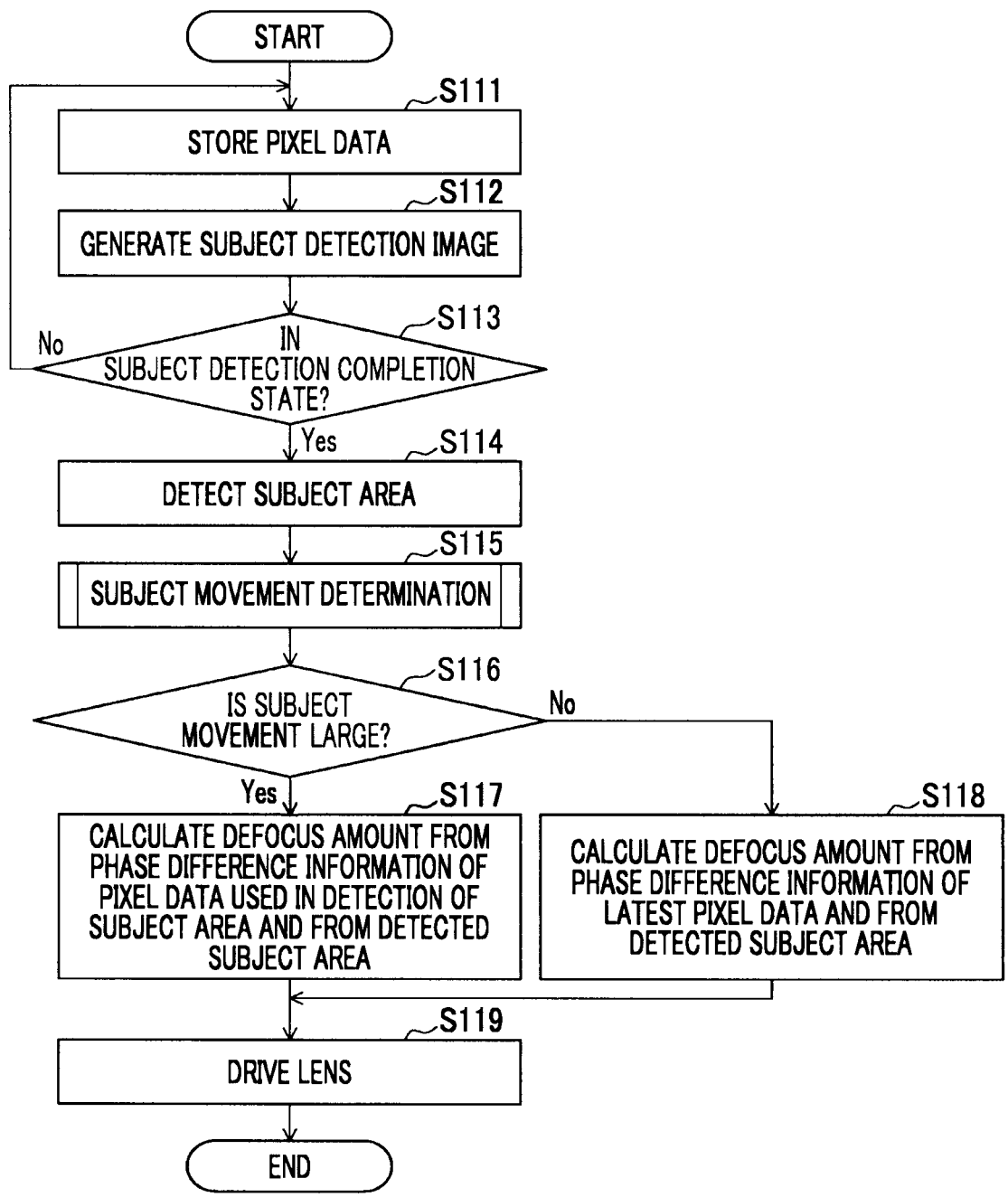
FIG. 11 is a flowchart illustrating an example of processing for lens driving via the digital camera 100.

FIG. 11 is a flowchart illustrating an example of processing for lens driving via the digital camera 100. For example, the digital camera 100 repeatedly executes the processing illustrated in FIG. 11 as the processing for lens driving. For example, this processing is executed by at least any of the system control unit 11 or the phase difference AF processing unit 19.

First, the digital camera 100 stores the pixel data obtained by the imaging element 5 (step S111). A location in which the pixel data is stored is, for example, the memory included in the system control unit 11 or the main memory 16. Next, the digital camera 100 generates the subject detection image based on the stored pixel data (step S112).

Next, the digital camera 100 determines whether or not a transition is made to a subject detection completion state (a state where the subject detection is completed) based on the subject detection image generated in step S112 (step S113). In a case where a transition is not made to the subject detection completion state (step S113: No), the digital camera 100 returns to step S111.

In step S113, in a case where a transition is made to the subject detection completion state (step S113: Yes), the digital camera 100 detects the subject area based on the subject detection image generated in step S112 (step S114).

Next, the digital camera 100 performs subject movement determination of determining the subject movement that is a deviation between the subject area (the second area e2 in the example in FIG. 10) detected in immediately previous step S114 and the subject area (the first area e1 in the example in FIG. 10) detected in previous step S114 (step S115). The subject movement determination in step S115 will be described later in FIG. 12.

Next, the digital camera 100 determines whether or not the subject movement is large based on the subject movement determination in step S115 (step S116). In a case where the subject movement is large (step S116: Yes), the digital camera 100 calculates the defocus amount from phase difference information of the pixel data used in the detection of the subject area in step S114 and from the subject area detected in step S114 (step S117). The pixel data used in the detection of the subject area is the pixel data that is the original data from which the subject detection image used in the detection of the subject area is generated.

In step S116, in a case where the subject movement is not large (step S116: No), the digital camera 100 calculates the defocus amount from the phase difference information of the latest pixel data at the moment and from the subject area detected in step S114 (step S118).

Next, the digital camera 100 performs lens driving based on the defocus amount calculated in any of steps S117 and S118 (step S119) and ends the series of processes. For example, this lens driving is performed by the system control unit 11 by outputting the control signal based on the defocus amount to the imaging lens 1.

Figure 12:
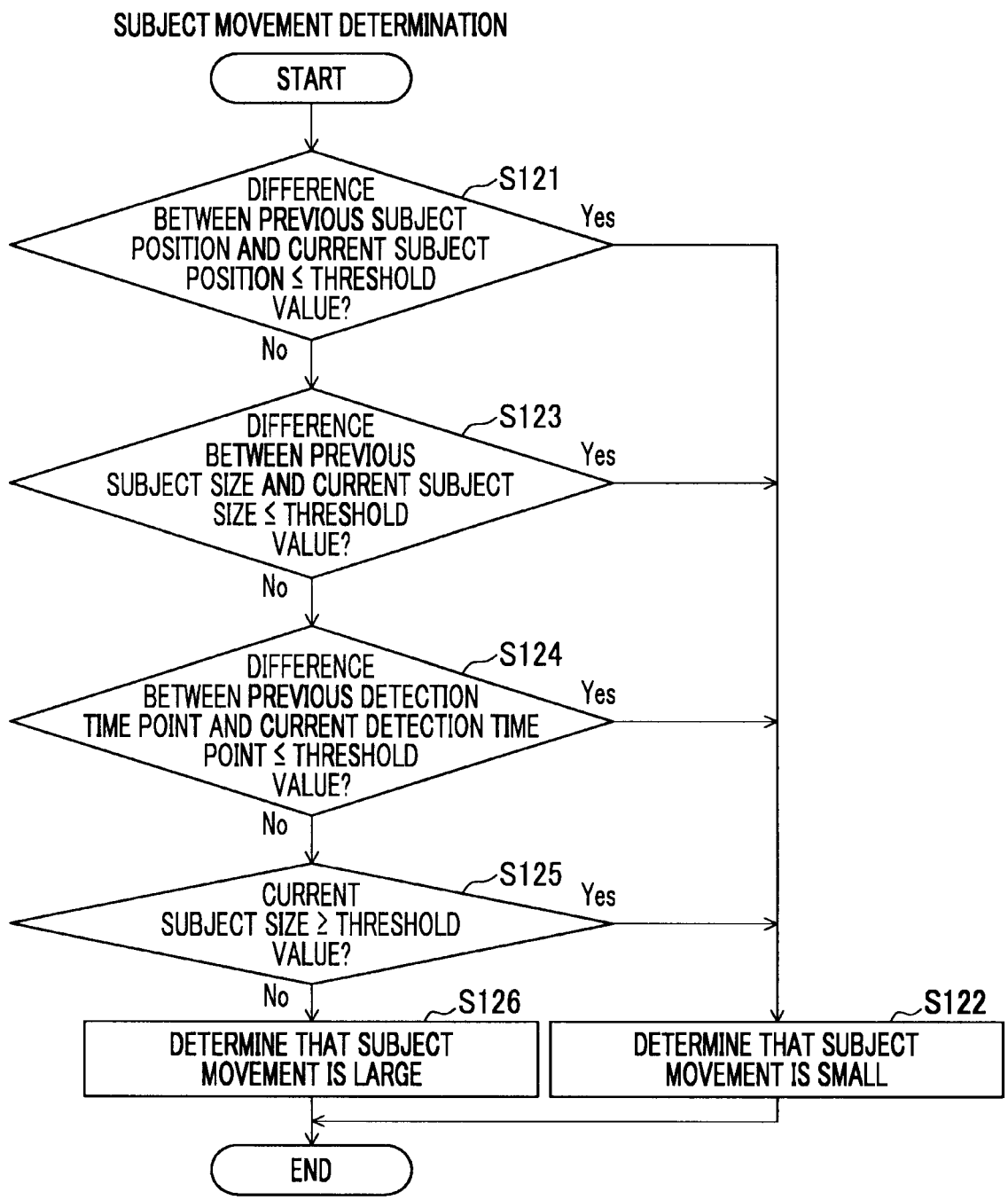
FIG. 12 is a flowchart illustrating an example of subject movement determination in step S115 in FIG. 11.

FIG. 12 is a flowchart illustrating an example of the subject movement determination in step S115 in FIG. 11. For example, the digital camera 100 executes the processing illustrated in FIG. 12 as the subject movement determination in step S115 in FIG. 11.

First, the digital camera 100 determines whether or not a difference between a previous subject position and a current subject position is less than or equal to a predetermined threshold value (step S121). The current subject position is a position of the subject area (the first area e1 in the example in FIG. 10) detected in immediately previously executed step S114. The previous subject position is the position of the subject area (the second area e2 in the example in FIG. 10) detected in step S114 that is executed immediately previously to immediately previously executed step S114. The position of the subject area is a center of the subject area as an example and may be an end part or the like of the subject area. In a case where the difference between the subject positions is less than or equal to the threshold value (step S121: Yes), the digital camera 100 determines that the subject movement is small (step S122), and ends the series of processes of the subject movement determination.

In step S121, in a case where the difference between the subject positions is not less than or equal to the threshold value (step S121: No), the digital camera 100 determines whether or not a difference between a previous subject size and a current subject size is less than or equal to a predetermined threshold value (step S123). The current subject size is a size of the subject area detected in immediately previously executed step S114. The previous subject size is the size of the subject area detected in step S114 that is executed immediately previously to immediately previously executed step S114. For example, the size of the subject area is the number of pixels of the subject area. In a case where the difference between the subject sizes is less than or equal to the threshold value (step S123: Yes), the digital camera 100 transitions to step S122 to determine that the subject movement is small, and ends the series of processes of the subject movement determination.

In step S123, in a case where the difference between the subject sizes is not less than or equal to the threshold value (step S123: No), the digital camera 100 determines whether or not a difference between a previous detection time point of the subject area and a current detection time point of the subject area is less than or equal to a predetermined threshold value (step S124). In a case where the difference between the detection time points of the subject area is less than or equal to the threshold value (step S124: Yes), it can be estimated that even in a case where the subject has moved, the movement is performed for a short time, and a deviation of the subject is very small. In this case, the digital camera 100 transitions to step S122 to determine that the subject movement is small, and ends the series of processes of the subject movement determination.

In step S124, in a case where the difference between the detection time points of the subject area is not less than or equal to the threshold value (step S124: No), whether or not the current subject size is greater than or equal to a predetermined threshold value is determined (step S125). In a case where the current subject size is greater than or equal to the threshold value (step S125: Yes), it can be estimated that even in a case where the subject has moved, misregistration between the detected subject area and the subject is very small. In this case, the digital camera 100 transitions to step S122 to determine that the subject movement is small, and ends the series of processes of the subject movement determination.

In step S125, in a case where the current subject size is not greater than or equal to the threshold value (step S125: No), the digital camera 100 determines that the subject movement is large (step S126), and ends the series of processes of the subject movement determination.

Accordingly, based on a result of comparison between the position of the first area e1 detected in the past and the position of the currently detected second area e2, the digital camera 100 selects the pixel data to be used in the AF detection based on the second area e2. Accordingly, it is possible to perform the AF detection by selecting any of the pixel data used in the detection of the second area e2 and newer pixel data depending on an amount of movement of the subject on the image.

In addition, based on a result of comparison between the size of the first area e1 detected in the past and the size of the currently detected second area e2, the digital camera 100 selects the pixel data to be used in the AF detection based on the second area e2. Accordingly, it is possible to perform the AF detection by selecting any of the pixel data used in the detection of the second area e2 and newer pixel data depending on an amount of change in a ratio of a region occupied by the subject on the image.

In addition, based on a result of comparison between the detection time point of the first area e1 in the past and the detection time point of the current second area e2, the digital camera 100 selects the pixel data to be used in the AF detection based on the second area e2. Accordingly, in a case where an elapsed time from the subject detection in the past is short, it is determined that the subject movement is small, and it is possible to perform the AF detection by selecting the new pixel data.

In addition, based on the size of the currently detected second area e2, the digital camera 100 selects the pixel data to be used in the AF detection based on the second area e2. Accordingly, in a case where the second area e2 is large, it is determined that the subject movement is small, and it is possible to perform the AF detection by selecting the new pixel data.

The subject movement determination illustrated in FIG. 12 is merely an example, and a part of the processing may be omitted. For example, the determination in at least any of steps S121, S123, S124, or S125 may be omitted, and the subject movement may be determined based on the rest of the determination.

Figure 13:
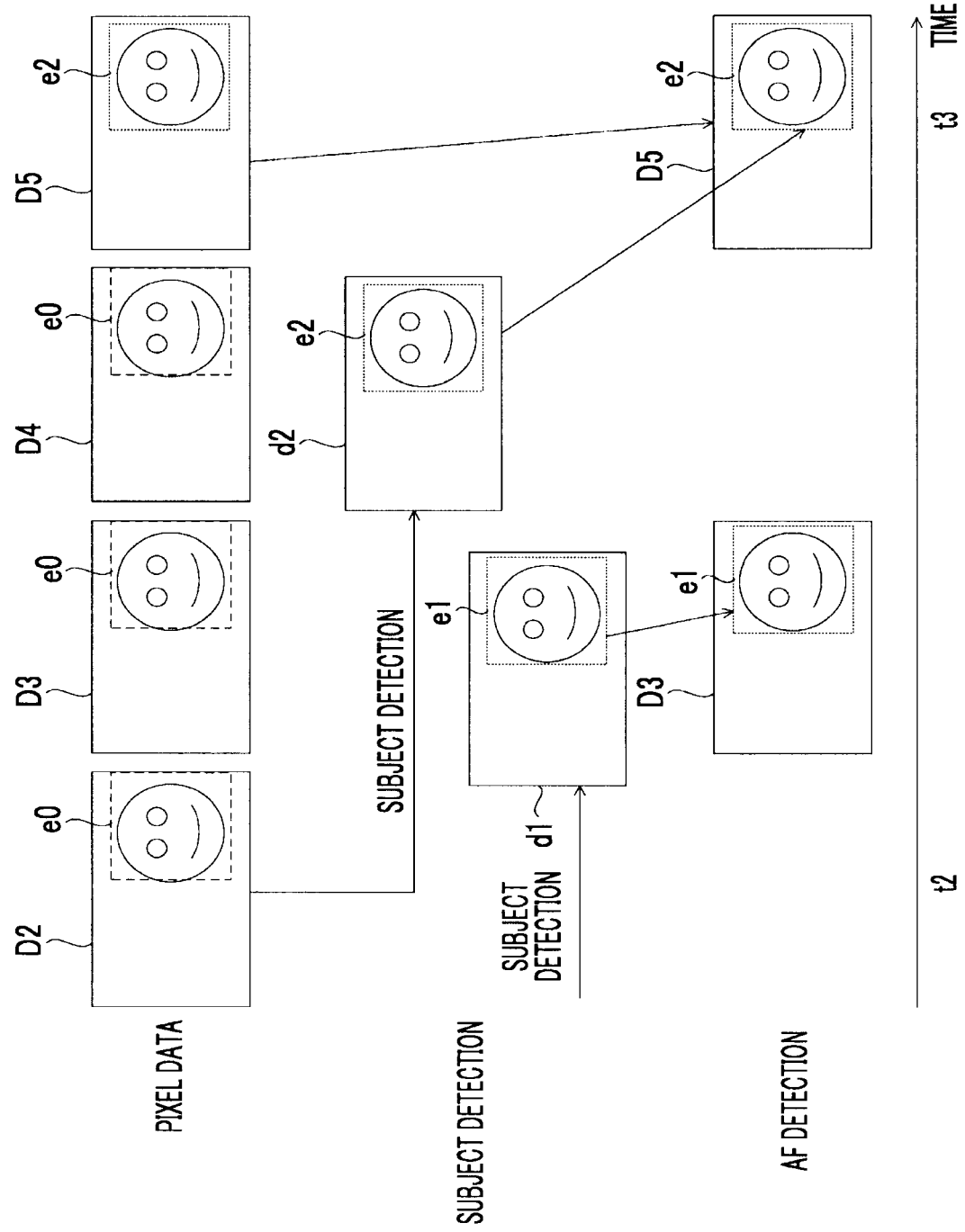
FIG. 13 is a diagram illustrating still another example of the focus operation of the digital camera 100.

FIG. 13 is a diagram illustrating still another example of the focus operation of the digital camera 100. The same parts as the parts illustrated in FIG. 10 will be designated by the identical reference numerals in FIG. 13, and those parts will not be described.

As illustrated in FIG. 13, for the pixel data D3 obtained during the subject detection from the subject detection image d2 based on the pixel data D2 obtained at time point t2, the digital camera 100 may perform the AF detection based on the first area e1 that is detected by the immediately previous subject detection, that is, the subject detection from the subject detection image d1.

Figure 14:
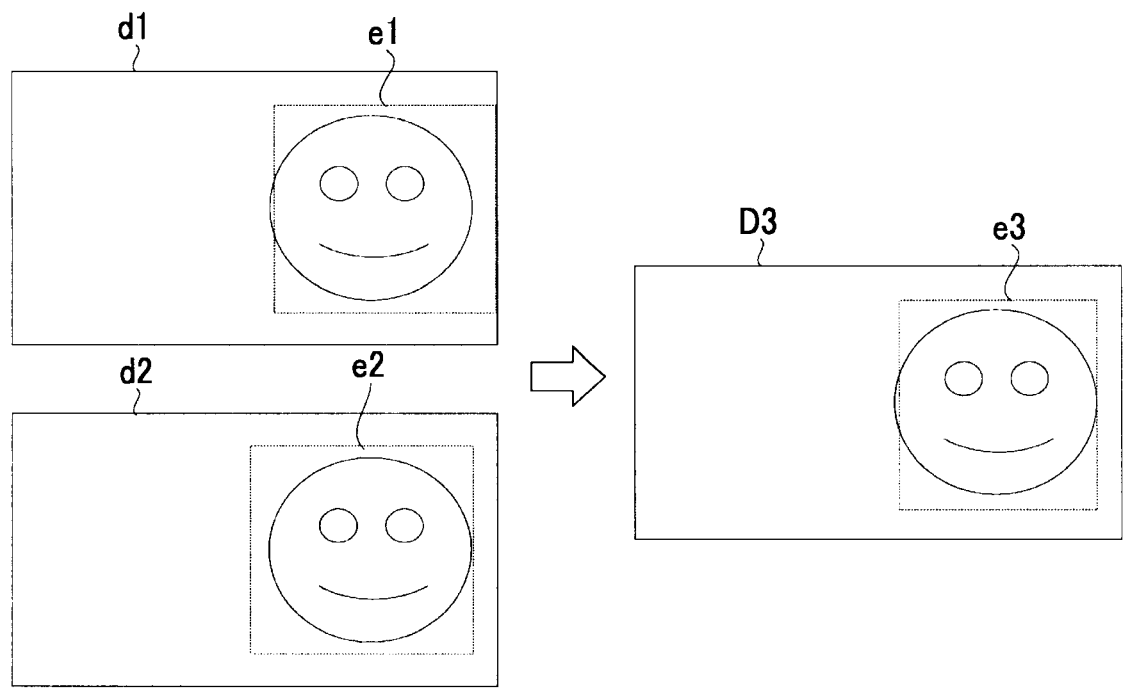
FIG. 14 is a diagram illustrating an example of an overlapping part between a second area e2 and a first area e1.

FIG. 14 is a diagram illustrating an example of an overlapping part between the second area e2 and the first area e1. An overlapping area e3 illustrated in FIG. 14 is the overlapping part between the first area e1 detected from the subject detection image d1 and the second area e2 detected from the subject detection image d2. The digital camera 100 calculates the phase difference of the part corresponding to the overlapping area e3 in the pixel data D3 obtained during the subject detection from the subject detection image d2 and uses the calculated phase difference of the AF prediction in a period in which the subject detection is not performed.

For example, the digital camera 100 calculates the phase difference for each position of a plurality of parts divided from the part corresponding to the first area e1 in the pixel data D3. The phase difference of the part not included in the second area e2 detected from the subject detection image d2 is excluded from the calculated phase difference at each position, and the rest of the phase differences is used in the AF prediction.

Alternatively, the digital camera 100 holds the pixel data D3 until the second area e2 is detected, calculates the overlapping area e3, which is the overlapping part between the first area e1 and the second area e2, in a case where the second area e2 is detected, calculates the phase difference of the part corresponding to the overlapping area e3 in the pixel data D3, and uses the calculated phase difference in the AF prediction.

While a case where the phase difference of the part corresponding to the overlapping area e3 in the pixel data D3 obtained from the detection of the first area e1 to the detection of the second area e2 is calculated and used in the AF prediction has been described in the examples illustrated in FIG. 13 and FIG. 14, the phase difference of the part corresponding to the overlapping area e3 may be calculated for a plurality of pieces of the pixel data obtained from the detection of the first area e1 to the detection of the second area e2 and be used in the AF prediction. The phase difference of the overlapping area e3 described in FIG. 13 and FIG. 14 is an example of a third focus position.

Figure 15:
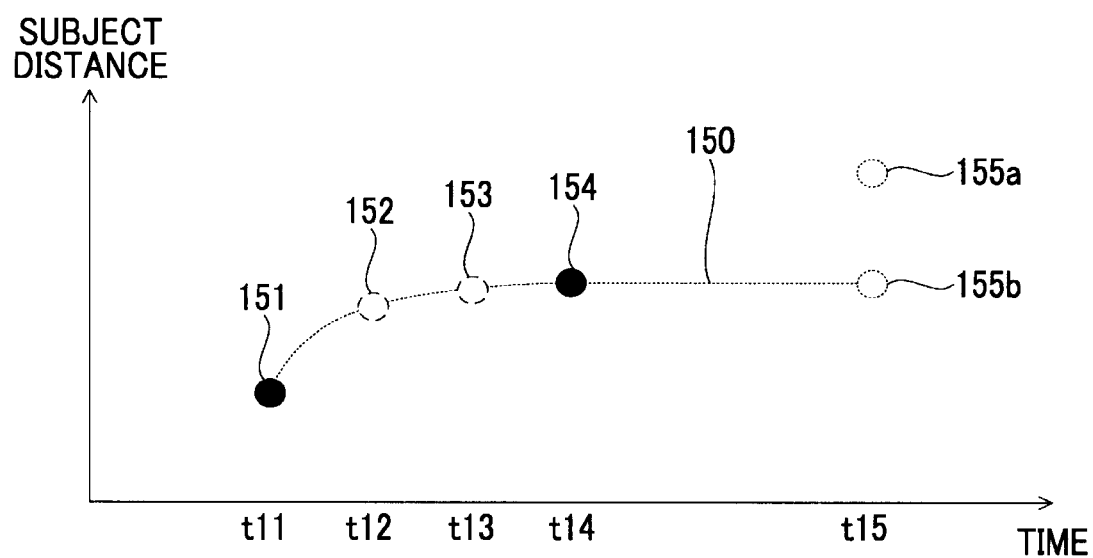
FIG. 15 is a diagram illustrating an example of AF prediction based on phase difference information of an overlapping area e3.

FIG. 15 is a diagram illustrating an example of the AF prediction based on the phase difference information of the overlapping area e3. In FIG. 15, a horizontal axis denotes time. A vertical axis is the subject distance and denotes a result of the AF detection or a result of the AF prediction.

A subject distance change 150 shows an actual change in time of the subject distance. In the example illustrated in FIG. 15, the subject is initially separated from the digital camera 100. However, a speed of separation from the digital camera 100 is gradually decreased, and the distance to the digital camera 100 is finally constantly maintained.

Time point t11 is a timing at which the AF detection based on the first area e1 detected from the subject detection image d1 based on the pixel data obtained at time point t1 is performed. An AF detection result 151 is a result of the AF detection at time point t11.

Time point t14 is a timing at which the AF detection based on the second area e2 detected from the subject detection image d2 based on the pixel data obtained at time point t2 is performed. An AF detection result 154 is a result of the AF detection at time point t14.

Time point t15 is an imaging timing immediately after time point t14. The digital camera 100 performs the AF prediction of predicting the subject distance at time point t15 in order to focus on the subject at time point t15. In a case where the subject distance at time point t15 is predicted (linearly predicted) based on only the AF detection results 151 and 154, an AF prediction result 155a is obtained and is significantly different from the actual subject distance at time point t15.

Time points t12 and t13 are time points between time point t11 and time point t14, that is, from the detection of the first area e1 to the detection of the second area e2, and are time points at each of which the pixel data is obtained. AF detection results 152 and 153 are results of the AF detection performed on the pixel data obtained at time points t12 and t13, respectively, based on the part corresponding to the overlapping area e3.

The digital camera 100 can obtain an AF prediction result 155b close to the actual subject distance at time point t15 by performing the AF prediction using the AF detection results 152 and 153 in addition to the AF detection results 151 and 154. It is possible to accurately focus on the subject by performing lens driving based on the AF prediction result 155b at time point t15.

That is, in a case where the AF detection is performed based on only the AF detection results 151 and 154 at time points t11 and t14 at which results of the subject detection are updated, a motion of the subject cannot be correctly perceived in a case where a frame rate of the AF detection is low. However, as described above, since the AF detection results 152 and 153 at positions having a strong possibility that the subject was present can also be acquired at time points t12 and t13 between time points t11 and t14, even the latest motion of the subject can be perceived, and the focus accuracy is improved.

Accordingly, in a case of performing AF using the second focus position based on the data of the second area e2 in the pixel data D5 obtained at time point t3 (third time point) (in a case where the subject movement is small), the digital camera 100 performs AF using the third focus position based on data of the overlapping part between the second area e2 and the first area e1 in the pixel data D3 obtained between the detection time point of the first area e1 detected as the subject area from the pixel data obtained at time point t1 (first time point) and the detection time point of the second area e2. For example, the digital camera 100 performs the AF prediction using the third focus position in the AF detection at a timing at which the subject detection is not performed.

Figure 16:
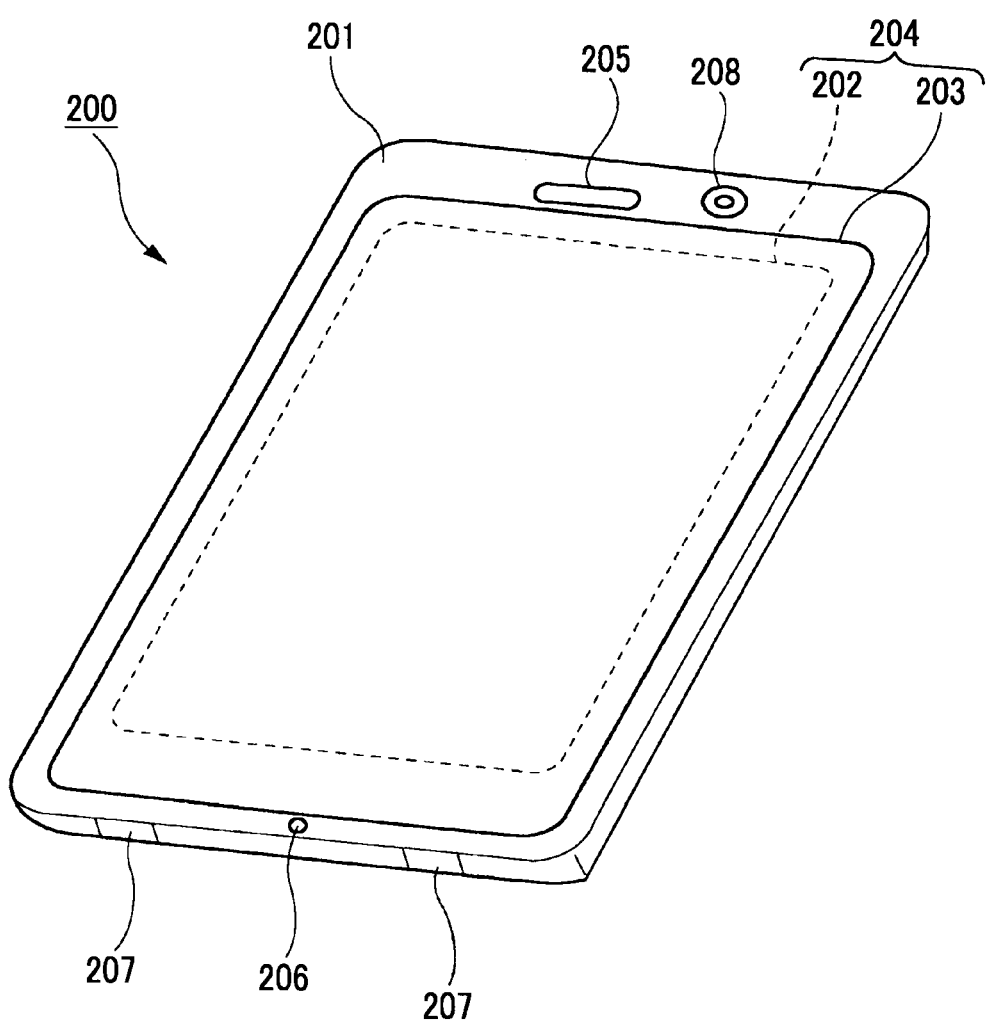
FIG. 16 illustrates an exterior of a smartphone 200 that is another embodiment of the imaging apparatus according to the present invention.

FIG. 16 illustrates an exterior of a smartphone 200 that is another embodiment of the imaging apparatus according to the present invention.

The smartphone 200 illustrated in FIG. 16 includes a casing 201 having a flat plate shape and comprises a display and input unit 204 in which a display panel 202 as a display unit and an operation panel 203 as an input unit are integrated on one surface of the casing 201.

In addition, the casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 17:
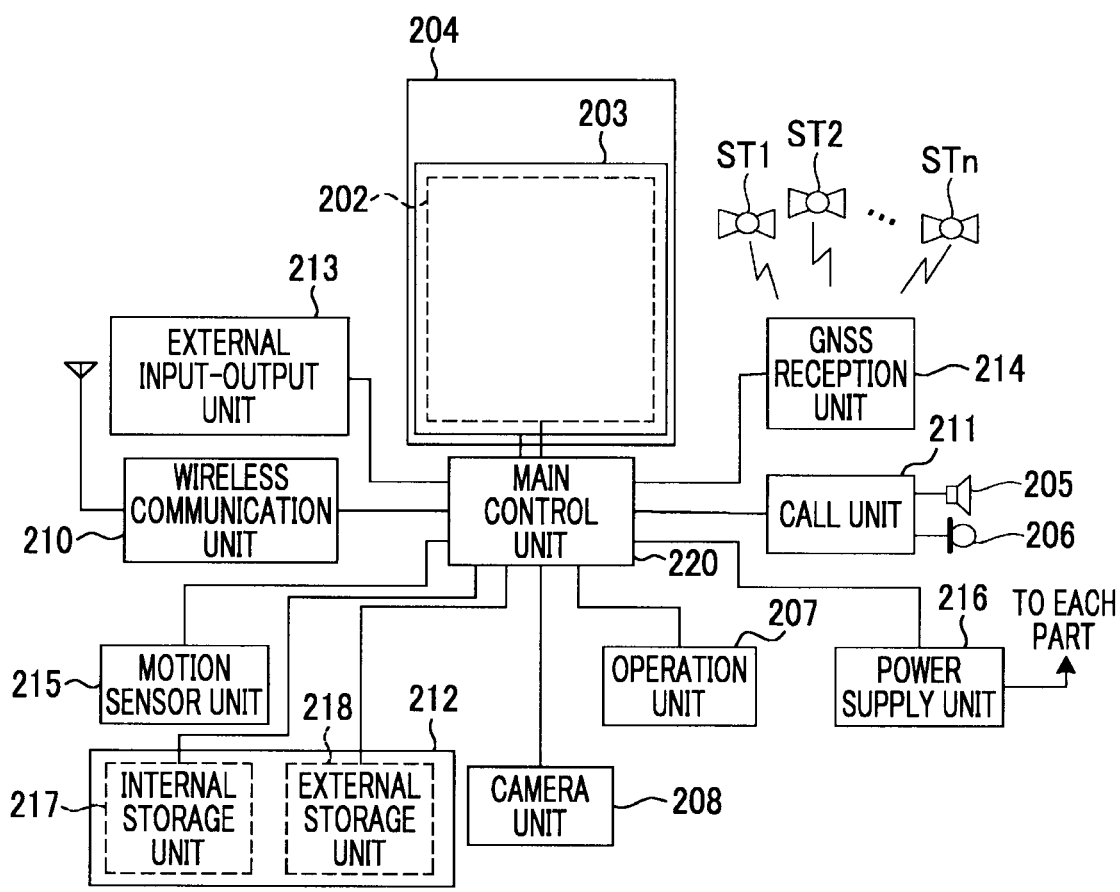
FIG. 17 is a block diagram illustrating a configuration of the smartphone 200 illustrated in FIG. 16.

FIG. 17 is a block diagram illustrating a configuration of the smartphone 200 illustrated in FIG. 16.

As illustrated in FIG. 17, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with instructions from the main control unit 220. By using the wireless communication, transmission and reception of various file data such as audio data and image data, electronic mail data, or the like and reception of web data, streaming data, or the like are performed.

The display and input unit 204 is a so-called touch panel that visually delivers information to the user by displaying images (still images and video images), text information, or the like and that detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main control unit 220. Next, the main control unit 220 detects an operation position (coordinates) on the display panel 202 based on the received detection signal.

As illustrated in FIG. 17, while the display panel 202 and the operation panel 203 of the smartphone 200 illustrated as an embodiment of the imaging apparatus according to the present invention are integrated to constitute the display and input unit 204, the operation panel 203 is disposed to completely cover the display panel 202.

In a case where such disposition is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge part, other than the overlapping part, that does not overlap with the display panel 202.

A size of the display region and a size of the display panel 202 may completely match, but both sizes do not need to match. In addition, the operation panel 203 may comprise two sensitive regions of the outer edge part and an inner part other than the outer edge part. Furthermore, a width of the outer edge part is appropriately designed depending on a size and the like of the casing 201.

Furthermore, examples of a position detection system employed in the operation panel 203 include a matrix switch system, a resistive membrane system, a surface acoustic wave method, an infrared method, an electromagnetic induction method, and a capacitance method, and any system can be employed.

The call unit 211 comprises the speaker 205 or the microphone 206, and converts voice of the user input through the microphone 206 into audio data processable in the main control unit 220 and outputs the audio data to the main control unit 220, or decodes audio data received by the wireless communication unit 210 or by the external input-output unit 213 and outputs the decoded audio data from the speaker 205.

In addition, as illustrated in FIG. 16, for example, the speaker 205 can be mounted on the same surface as a surface on which the display and input unit 204 is provided, and the microphone 206 can be mounted on a side surface of the casing 201.

The operation unit 207 is a hardware key that uses a key switch or the like, and receives instructions from the user. For example, as illustrated in FIG. 16, the operation unit 207 is a push button-type switch that is mounted on a side surface of the casing 201 of the smartphone 200 and that is set to an ON state in a case where the switch is pressed with the finger or the like, and is set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and with an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication or the like (for example, a universal serial bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone connected in a wired/wireless manner.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position consisting of a latitude, a longitude, and an altitude of the smartphone 200 in accordance with instructions from the main control unit 220. In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with instructions from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each part of the smartphone 200 in accordance with instructions from the main control unit 220.

The main control unit 220 comprises a microprocessor, operates in accordance with the control program and with the control data stored in the storage unit 212, and manages and controls each part of the smartphone 200. In addition, the main control unit 220 has a mobile communication control function of controlling each part of a communication system and an application processing function in order to perform voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main control unit 220 has an image processing function such as displaying an image on the display and input unit 204 based on image data (data of a still image or of a video image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control of the display panel 202 and an operation detection control of detecting user operations performed through the operation unit 207 and through the operation panel 203.

By executing the display control, the main control unit 220 displays an icon for starting the application software or for a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image made through the scroll bar.

Furthermore, by executing the operation detection control, the main control unit 220 is provided with a touch panel control function of determining whether the operation position on the operation panel 203 is in the overlapping part (display region) overlapping with the display panel 202 or is in the other outer edge part (non-display region) not overlapping with the display panel 202 and of controlling the sensitive region of the operation panel 203 or a display position of the software key.

In addition, the main control unit 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or as a combination thereof, drawing a path from at least one of the plurality of positions.

The camera unit 208 includes configurations other than the external memory control unit 20, the recording medium 21, the display control unit 22, the display unit 23, and the operation unit 14 in the digital camera 100 illustrated in FIG. 1. Captured image data generated by the camera unit 208 can be recorded in the storage unit 212 or be output through the external input-output unit 213 or through the wireless communication unit 210.

In the smartphone 200 illustrated in FIG. 16, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as an operation input of the operation panel 203.

In addition, in detecting the position via the GNSS reception unit 214, the position can be detected by referring to the image from the camera unit 208. Furthermore, by referring to the image from the camera unit 208, it is possible to determine an optical axis direction of the camera unit 208 of the smartphone 200 or to determine the current use environment without using the three-axis acceleration sensor or by using the three-axis acceleration sensor together. The image from the camera unit 208 can also be used in the application software.

In addition, image data of a still image or of a video image to which the positional information acquired by the GNSS reception unit 214, voice information (may be text information acquired by performing voice to text conversion via the main control unit or the like) acquired by the microphone 206, posture information acquired by the motion sensor unit 215, or the like is added can be stored in the storage unit 212 or be output through the external input-output unit 213 or through the wireless communication unit 210.

Even in the smartphone 200 having the above configuration, it is possible to improve the focus accuracy by the system control unit 11 illustrated in FIG. 1 by performing the processing described above.

Modification Example 1

While a case of detecting the phase difference in the row direction X has been illustrated in the embodiment, the present invention can also be applied to a case of detecting the phase difference in the column direction Y.

Modification Example 2

While a case of performing the AF detection based on the phase difference AF system via the phase difference AF processing unit 19 as the AF detection 74 has been described in the embodiment, it may also be configured to perform the AF detection based on the contrast system via the contrast AF processing unit 18 as the AF detection 74. In addition, it may be configured to perform the AF detection based on a combination of the phase difference AF system and the contrast system as the AF detection 74.

As described above, the following matters are disclosed in the present specification.

(1) An imaging apparatus comprising an imaging element that images a subject through an imaging optical system, and a processor, in which the processor is configured to detect a subject area as a second area from pixel data obtained by the imaging element at a second time point, and output, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

(2) The imaging apparatus according to (1), in which the processor is configured to output, to the lens drive mechanism, the control signal generated by selectively using the first focus position and the second focus position based on a result of comparison between a first area detected as the subject area from pixel data obtained by the imaging element at a first time point before the second time point and the second area.

(3) The imaging apparatus according to (2), in which the imaging element performs periodic imaging, and each of the first time point, the second time point, and the third time point is a time point included in time points of the periodic imaging via the imaging element.

(4) The imaging apparatus according to (2) or (3), in which the processor is configured to output, to the lens drive mechanism, the control signal generated by selectively using the first focus position and the second focus position based on a result of comparison between a position of the first area and a position of the second area.

(5) The imaging apparatus according to any one of (2) to (4), in which the processor is configured to output, to the lens drive mechanism, the control signal generated by selectively using the first focus position and the second focus position based on a result of comparison between a size of the first area and a size of the second area.

(6) The imaging apparatus according to any one of (2) to (5), in which the processor is configured to output, to the lens drive mechanism, the control signal generated by selectively using the first focus position and the second focus position based on a result of comparison between a detection time point of the first area and a detection time point of the second area.

(7) The imaging apparatus according to any one of (1) to (6), in which the processor is configured to output, to the lens drive mechanism, the control signal generated by selectively using the first focus position and the second focus position based on a size of the second area.

(8) The imaging apparatus according to any one of (1) to (7), in which the processor is configured to, in a case of outputting the control signal generated using the second focus position to the lens drive mechanism, generate the control signal to be output to the lens drive mechanism after detecting the second area, using a third focus position based on data of an overlapping part between the second area and a first area in pixel data obtained by the imaging element between a detection time point of the first area detected as the subject area from pixel data obtained by the imaging element at a first time point before the second time point and a detection time point of the second area.

(9) The imaging apparatus according to any one of (1) to (8), in which the pixel data obtained at the third time point is pixel data obtained by the imaging element immediately before a detection time point of the second area.

(10) A focus control method by an imaging apparatus including an imaging element that images a subject through an imaging optical system, and a processor, the focus control method comprising, via the processor, detecting a subject area as a second area from pixel data obtained by the imaging element at a second time point, and outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

(11) The focus control method according to (10), in which the processor is configured to output, to the lens drive mechanism, the control signal generated by selectively using the first focus position and the second focus position based on a result of comparison between a first area detected as the subject area from pixel data obtained by the imaging element at a first time point before the second time point and the second area.

(12) The focus control method according to (11), in which the imaging element performs periodic imaging, and each of the first time point, the second time point, and the third time point is a time point included in time points of the periodic imaging via the imaging element.

(13) The focus control method according to (11) or (12), in which the processor is configured to output, to the lens drive mechanism, the control signal generated by selectively using the first focus position and the second focus position based on a result of comparison between a position of the first area and a position of the second area.

(14) The focus control method according to any one of (11) to (13), in which the processor is configured to output, to the lens drive mechanism, the control signal generated by selectively using the first focus position and the second focus position based on a result of comparison between a size of the first area and a size of the second area.

(15) The focus control method according to any one of (11) to (14), in which the processor is configured to output, to the lens drive mechanism, the control signal generated by selectively using the first focus position and the second focus position based on a result of comparison between a detection time point of the first area and a detection time point of the second area.

(16) The focus control method according to any one of (10) to (15), in which the processor is configured to output, to the lens drive mechanism, the control signal generated by selectively using the first focus position and the second focus position based on a size of the second area.

(17) The focus control method according to any one of (10) to (16), in which the processor is configured to, in a case of outputting the control signal generated using the second focus position to the lens drive mechanism, generate the control signal to be output to the lens drive mechanism after detecting the second area, using a third focus position based on data of an overlapping part between the second area and a first area in pixel data obtained by the imaging element between a detection time point of the first area detected as the subject area from pixel data obtained by the imaging element at a first time point before the second time point and a detection time point of the second area.

(18) The focus control method according to any one of (10) to (17), in which the pixel data obtained at the third time point is pixel data obtained by the imaging element immediately before a detection time point of the second area.

(19) A focus control program of an imaging apparatus including an imaging element that images a subject through an imaging optical system, and a processor, the focus control program causing the processor to execute a process comprising detecting a subject area as a second area from pixel data obtained by the imaging element at a second time point, and outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point.

While various embodiments have been described above with reference to the drawings, the present invention is, of course, not limited to such examples. It is apparent that those skilled in the art may perceive various modification examples or correction examples within the scope disclosed in the claims, and those examples are also understood as falling within the technical scope of the present invention. In addition, each constituent in the embodiment may be arbitrarily combined without departing from the gist of the invention.

The present application is based on Japanese Patent Application (JP2020-219588) filed on Dec. 28, 2020, the content of which is incorporated in the present application by reference.

The present invention is particularly applied to a digital camera or the like to provide high convenience and effectiveness.

EXPLANATION OF REFERENCES

1: imaging lens
4: lens control unit
5: imaging element
6: analog signal processing unit
7: analog-to-digital conversion circuit
8: lens drive unit
9: stop drive unit
10: imaging element drive unit
11: system control unit
14, 207: operation unit
15: memory control unit
16: main memory
17: digital signal processing section
18: contrast AF processing unit
19: phase difference AF processing unit
20: external memory control unit
21: recording medium
22: display control unit
23: display unit
25: data bus
40: lens device
50: light-receiving surface
51: pixel
53: AF area
71: imaging operation
71a: exposure operation
71b: display operation
71c: recording operation
72: image generation
73, 73a, 73b: subject detection
74, 74b: AF detection
75: AF prediction
76: focus
100: digital camera
150: subject distance change
151 to 154: AF detection result
155a, 155b: AF prediction result
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit
e1: first area
e2: second area
e3: overlapping area
r1, r2, g1, g2, b1, b2, 52A, 52B: phase difference detection pixel
t1, t2, t3, a1, t12, t13, t14, t15: time point
D2 to D5: pixel data
d1, d2: subject detection image
ST1 to STn: GNSS satellite

What is claimed is:

1. An imaging apparatus comprising:
an imaging element that images a subject through an imaging optical system; and
a processor,
wherein the processor is configured to:
   detect a subject area as a second area from pixel data obtained by the imaging element at a second time point; and
   output, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point,
wherein the processor is configured to output the control signal generated by using the second focus position to the lens drive mechanism in a case where a difference between a position of a first area, which is detected as the subject area from pixel data obtained by the imaging element at a first time point before the second time point, and a position of the second area is less than or equal to a predetermined threshold value, and output the control signal generated by using the first focus position to the lens drive mechanism in a case where the difference is more than the predetermined threshold value.

2. The imaging apparatus according to claim 1, wherein the imaging element performs periodic imaging, and
each of the first time point, the second time point, and the third time point is a time point included in time points of the periodic imaging via the imaging element.

3. The imaging apparatus according to claim 1, wherein the processor is configured to output, to the lens drive mechanism, the control signal generated by selectively using the first focus position and the second focus position based on a result of comparison between a size of the first area and a size of the second area.

4. The imaging apparatus according to claim 1, wherein the processor is configured to output, to the lens drive mechanism, the control signal generated by selectively using the first focus position and the second focus position based on a result of comparison between a detection time point of the first area and a detection time point of the second area.

5. The imaging apparatus according to claim 1, wherein the processor is configured to output, to the lens drive mechanism, the control signal generated by selectively using the first focus position and the second focus position based on a size of the second area.

6. The imaging apparatus according to claim 1, wherein the processor is configured to, in a case of outputting the control signal generated using the second focus position to the lens drive mechanism, generate the control signal to be output to the lens drive mechanism after detecting the second area, using a third focus position based on data of an overlapping part between the second area and a first area in pixel data obtained by the imaging element between a detection time point of the first area detected as the subject area from pixel data obtained by the imaging element at a first time point before the second time point and a detection time point of the second area.

7. The imaging apparatus according to claim 1, wherein the pixel data obtained at the third time point is pixel data obtained by the imaging element immediately before a detection time point of the second area.

8. A focus control method by an imaging apparatus including an imaging element that images a subject through an imaging optical system, and a processor, the focus control method comprising:
via the processor,
detecting a subject area as a second area from pixel data obtained by the imaging element at a second time point;
outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point; and
outputting the control signal generated by using the second focus position to the lens drive mechanism in a case where a difference between a position of the first area and a position of the second area is less than or equal to a predetermined threshold value, and output the control signal generated by using the first focus position to the lens drive mechanism in a case where the difference is more than the predetermined threshold value.

9. The focus control method according to claim 8, wherein the imaging element performs periodic imaging, and
each of the first time point, the second time point, and the third time point is a time point included in time points of the periodic imaging via the imaging element.

10. The focus control method according to claim 8, comprising, via the processor,
outputting, to the lens drive mechanism, the control signal generated by selectively using the first focus position and the second focus position based on a result of comparison between a size of the first area and a size of the second area.

11. The focus control method according to claim 8, comprising, via the processor,
outputting, to the lens drive mechanism, the control signal generated by selectively using the first focus position and the second focus position based on a result of comparison between a detection time point of the first area and a detection time point of the second area.

12. The focus control method according to claim 8, comprising, via the processor,
outputting, to the lens drive mechanism, the control signal generated by selectively using the first focus position and the second focus position based on a size of the second area.

13. The focus control method according to claim 8, comprising, via the processor,
in a case of outputting the control signal generated using the second focus position to the lens drive mechanism, generating the control signal to be output to the lens drive mechanism after detecting the second area, using a third focus position based on data of an overlapping part between the second area and a first area in pixel data obtained by the imaging element between a detection time point of the first area detected as the subject area from pixel data obtained by the imaging element at a first time point before the second time point and a detection time point of the second area.

14. The focus control method according to claim 8, wherein the pixel data obtained at the third time point is pixel data obtained by the imaging element immediately before a detection time point of the second area.

15. A non-transitory computer readable medium storing a focus control program of an imaging apparatus including an imaging element that images a subject through an imaging optical system, and a processor, the focus control program causing the processor to execute a process comprising:
detecting a subject area as a second area from pixel data obtained by the imaging element at a second time point;
outputting, to a lens drive mechanism of the imaging optical system, a control signal generated by selectively using a first focus position based on data of the second area in the pixel data obtained at the second time point and a second focus position based on data of the second area in pixel data obtained by the imaging element at a third time point after the second time point; and
outputting the control signal generated by using the second focus position to the lens drive mechanism in a case where a difference between a position of the first area and a position of the second area is less than or equal to a predetermined threshold value, and output the control signal generated by using the first focus position to the lens drive mechanism in a case where the difference is more than the predetermined threshold value.

* * * * *